(12) United States Patent
Yang et al.

(10) Patent No.: US 12,628,181 B2
(45) Date of Patent: May 12, 2026

(54) DATA RECEIVING METHOD AND APPARATUS AND DATA SENDING METHOD AND APPARATUS

(71) Applicant: HUAWEI TECHNOLOGIES CO., LTD., Shenzhen (CN)

(72) Inventors: Hongjian Yang, Beijing (CN); Lei Guan, Beijing (CN); Jinhuan Xia, Beijing (CN); Ruixiang Ma, Shenzhen (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 18/350,050

(22) Filed: Jul. 11, 2023

(65) Prior Publication Data

US 2023/0354370 A1    Nov. 2, 2023

Related U.S. Application Data

(63) Continuation of application No. PCT/CN2021/071163, filed on Jan. 12, 2021.

(51) Int. Cl.
*H04W 72/232* (2023.01)
*H04L 1/00* (2006.01)
*H04W 72/1273* (2023.01)

(52) U.S. Cl.
CPC ......... *H04W 72/232* (2023.01); *H04L 1/0061* (2013.01); *H04W 72/1273* (2013.01)

(58) Field of Classification Search
CPC . H04W 72/232; H04W 72/1273; H04W 8/26; H04W 72/0453; H04L 1/0061;
(Continued)

(56) References Cited

U.S. PATENT DOCUMENTS

2018/0092122 A1* 3/2018 Babaei .................. H04L 1/1822
2019/0191486 A1* 6/2019 Myung ................. H04L 5/0044
(Continued)

FOREIGN PATENT DOCUMENTS

CN      110971355 A    4/2020
EP      3051727 A1     8/2016
WO      2022082604 A1  4/2022

OTHER PUBLICATIONS

Vivo, Discussion on mechanisms to support group scheduling for RRC_CONNECTED UEs, R1-2007691, Oct. 26-Nov. 13, 2020, total 7 pages.
(Continued)

*Primary Examiner* — Phirin Sam
*Assistant Examiner* — Mang Boi Thawng

(57) ABSTRACT

A data transmission (including receiving and sending) method is disclosed. According to the data transmission method, a terminal device receives downlink control information (DCI), where cyclic redundancy check (CRC) of the DCI is scrambled by using a first RNTI, the DCI is used to schedule a first downlink data channel, and the first downlink data channel is scrambled by using a second RNTI; and the terminal device receives the first downlink data channel based on the DCI. The DCI includes a DAI domain and/or an FDRA domain. The DAI domain indicates a count of first HARQ-ACK information in a first HARQ-ACK codebook, and the first HARQ-ACK codebook corresponds to the first RNTI. The FDRA domain indicates, within a frequency domain range of a public frequency resource, a scheduled frequency domain resource on the first downlink data channel.

18 Claims, 5 Drawing Sheets

(58) Field of Classification Search
CPC ... H04L 1/1854; H04L 1/1861; H04L 1/1896;
H04L 5/0094; H04L 5/0044; H04L
5/0055; H04L 2001/0093
See application file for complete search history.

(56) References Cited

U.S. PATENT DOCUMENTS

| | | | |
|---|---|---|---|
| 2019/0327761 A1* | 10/2019 | Suzuki | H04W 28/04 |
| 2020/0008097 A1 | 1/2020 | Fujishiro et al. | |
| 2023/0049784 A1* | 2/2023 | Lee | H04W 72/23 |
| 2023/0336284 A1* | 10/2023 | Gao | H04L 1/1819 |
| 2023/0337216 A1* | 10/2023 | Park | H04W 72/569 |
| 2023/0379090 A1* | 11/2023 | Ying | H04L 1/1822 |

OTHER PUBLICATIONS

International Search Report and Written Opinion issued in PCT/CN2021/071163, dated Jun. 28, 2021, 10 pages.
Extended European Search Report issued in EP21918156.7, dated Feb. 15, 2024, 10 pages.

* cited by examiner

100

120

110

DATA RECEIVING METHOD AND APPARATUS AND DATA SENDING METHOD AND APPARATUS

CROSS-REFERENCE TO RELATED APPLICATIONS

This application is a continuation of International Application No. PCT/CN2021/071163, filed on Jan. 12, 2021, the disclosure of which is hereby incorporated by reference in its entirety.

TECHNICAL FIELD

This disclosure relates to the communication field, and more specifically, to a data receiving method and apparatus and a data sending method and apparatus.

BACKGROUND

In a 5th generation (5G) mobile communication system, a network device may schedule, by using downlink control information (DCI) scrambled by using a radio network temporary identifier (RNTI), a downlink data channel scrambled by using the RNTI. After receiving the DCI scrambled by using the RNTI, a terminal device may receive the downlink data channel based on the DCI, and may determine, based on the RNTI, a function of a downlink assignment index (DAI) domain and/or a frequency domain resource assignment (FDRA) domain included in the DCI.

However, when the received DCI is scrambled by using a first RNTI, and the downlink data channel scheduled by using the DCI is scrambled by using a second RNTI different from the first RNTI, the terminal device cannot determine whether the function of the DAI domain and/or the FDRA domain in the DCI corresponds to the first RNTI or the second RNTI. Consequently, the terminal device and the network device cannot uniformly understand information in the DCI.

SUMMARY

This disclosure provides a data receiving method and apparatus. When a scrambling identifier of DCI for scheduling a downlink data channel is different from a scrambling identifier of a scheduled downlink data channel, a terminal device and a network device can uniformly understand information in the DCI, and correct data transmission is performed based on the information in the DCI.

According to a first aspect, a data receiving method is provided. The data receiving method may be performed by a terminal device, or may be performed by a chip or a circuit disposed in a terminal device. This is not limited in this disclosure.

The data receiving method includes:

receiving first downlink control information (DCI), where cyclic redundancy check (CRC) of the first DCI is scrambled by using a first radio network temporary identifier (RNTI), the first DCI is used to schedule a first downlink data channel, the first downlink data channel is scrambled by using a second RNTI, the first downlink data channel is scheduled in a public frequency resource, the public frequency resource is configured in a bandwidth part (BWP), the BWP is a dedicated BWP configured for the terminal device, the first DCI includes a downlink assignment index (DAI) domain and/or a frequency domain resource assignment (FDRA) domain, the DAI domain indicates a count of first hybrid automatic repeat request-acknowledgment (HARQ-ACK) information in a first HARQ-ACK codebook, the first HARQ-ACK information corresponds to the first downlink data channel, the first HARQ-ACK codebook corresponds to the first RNTI, and the FDRA domain indicates, within a frequency domain range of the public frequency resource, a scheduled frequency domain resource on the first downlink data channel; and receiving the first downlink data channel based on the first DCI.

According to the data receiving method provided in this embodiment, in a scenario in which the DCI scrambled by using the first RNTI schedules the first data channel scrambled by using the second RNTI, the terminal device and a network device may align functions of the DAI domain and/or the FDRA domain in the DCI, so that correct data transmission can be performed based on information in the DCI.

With reference to the first aspect, in some implementations of the first aspect, the method further includes: The first RNTI is a first cell radio network temporary identifier (C-RNTI), and the second RNTI is a first group radio network temporary identifier (G-RNTI).

Further, the first RNTI is a unicast identifier, and the second RNTI is a multicast identifier. In other words, the method provided in this embodiment may be applied to a scenario in which DCI scrambled by using a unicast identifier schedules a downlink data channel scrambled by using a multicast identifier.

With reference to the first aspect, in some implementations of the first aspect, the FDRA domain corresponds to a first bit sequence, and a part of bits in the first bit sequence form a second bit sequence, or the first bit sequence is padded with at least one bit to form the second bit sequence. The second bit sequence is used to parse, within the frequency domain range of the public frequency resource, the scheduled frequency domain resource on the first downlink data channel.

With reference to the first aspect, in some implementations of the first aspect, a corresponding quantity of bits obtained when the FDRA domain is parsed based on a frequency domain range of the BWP is a first value, and a corresponding quantity of bits obtained when the FDRA domain is parsed based on the frequency domain range of the public frequency resource is a second value. When the first value is greater than the second value, the part of bits in the first bit sequence form the second bit sequence; or when the first value is less than the second value, the first bit sequence is padded with the at least one bit to form the second bit sequence. A quantity of bits included in the second bit sequence is equal to the second value.

In this embodiment, a bit sequence occupied by the FDRA domain in the DCI may continue to use a stipulation in a current protocol, so that compatibility of the solution is improved.

According to a second aspect, a data sending method is provided. The data sending method may be performed by a network device, or may be performed by a chip or a circuit disposed in a network device. This is not limited in this disclosure.

The data sending method includes:

Sending first downlink control information (DCI), where cyclic redundancy check (CRC) of the first DCI is scrambled by using a first radio network temporary identifier (RNTI), the first DCI is used to schedule a first downlink data channel, the first downlink data channel is scrambled by using a second RNTI, the first downlink data channel is scheduled in a public frequency resource, the public frequency resource is configured in a bandwidth part (BWP), the BWP is a dedicated BWP configured for the terminal device, the first DCI includes a downlink assignment index (DAI) domain and/or a frequency domain resource assignment (FDRA) domain, the DAI domain indicates a count of first hybrid automatic repeat request-acknowledgment (HARQ-ACK) information in a first HARQ-ACK codebook, the first HARQ-ACK information corresponds to the first downlink data channel, the first HARQ-ACK codebook corresponds to the first RNTI, and the FDRA domain indicates, within a frequency domain range of the public frequency resource, a scheduled frequency domain resource on the first downlink data channel; and sending the first downlink data channel based on the first DCI.

According to the data sending method provided in this embodiment, in a scenario in which the first DCI scrambled by using the first RNTI schedules the first data channel scrambled by using the second RNTI, a terminal device and the network device may align functions of the DAI domain and/or the FDRA domain in the DCI, so that correct data transmission can be performed based on information in the DCI.

With reference to the second aspect, in some implementations of the second aspect, the first RNTI is a first cell radio network temporary identifier (C-RNTI), and the second RNTI is a first group radio network temporary identifier (G-RNTI).

Further, the first RNTI is a unicast identifier, and the second RNTI is a multicast identifier. In other words, the method provided in this embodiment may be applied to a scenario in which DCI scrambled by using a unicast identifier schedules a downlink data channel scrambled by using a multicast identifier.

With reference to the second aspect, in some implementations of the second aspect, the FDRA domain corresponds to a first bit sequence, and a part of bits in the first bit sequence form a second bit sequence, or the first bit sequence is padded with at least one bit to form the second bit sequence. The second bit sequence is used to parse, within the frequency domain range of the public frequency resource, the scheduled frequency domain resource on the first downlink data channel.

With reference to the second aspect, in some implementations of the second aspect, a corresponding quantity of bits obtained when the FDRA domain is parsed based on a frequency domain range of the BWP is a first value, and a corresponding quantity of bits obtained when the FDRA domain is parsed based on the frequency domain range of the public frequency resource is a second value. When the first value is greater than the second value, the part of bits in the first bit sequence form the second bit sequence; or when the first value is less than the second value, the first bit sequence is padded with the at least one bit to form the second bit sequence. A quantity of bits included in the second bit sequence is equal to the second value.

In this embodiment, a bit sequence occupied by the FDRA domain in the DCI may continue to use a stipulation in a current protocol, so that compatibility of the solution is improved.

According to a third aspect, a data receiving method is provided. The data receiving method may be performed by a terminal device, or may be performed by a chip or a circuit disposed in a terminal device. This is not limited in this disclosure. Specifically, the terminal device is configured to monitor second downlink control information (DCI) and third DCI.

The data receiving method includes the following.

The terminal device receives the second DCI, where the second DCI is used to schedule a second downlink data channel, the third DCI is used to schedule a third downlink data channel, cyclic redundancy check (CRC) of the second DCI is scrambled by using a third radio network temporary identifier (RNTI), CRC of the third DCI is scrambled by using a fourth RNTI, the second DCI includes a first hybrid automatic repeat request process number (HPN) domain and a first new data indicator (NDI) domain, and the third DCI includes a second HPN domain and a second NDI domain. The terminal device receives fourth DCI, where the fourth DCI is used to schedule a fourth downlink data channel, CRC of the fourth DCI is scrambled by using a fifth RNTI, and the fourth DCI includes a third HPN domain and a third NDI domain. The terminal device determines that the fifth RNTI is associated with the third RNTI. The terminal device receives the fourth downlink data channel.

According to the data receiving method provided in this embodiment, before receiving the fourth downlink data channel scheduled by using the fourth DCI, the terminal device may determine, based on association between the fifth RNTI and the third RNTI, that a data packet carried on the fourth downlink data channel is a retransmitted data packet carried on the second downlink data channel, so that correct data transmission can be performed based on information in the DCI.

With reference to the third aspect, in some implementations of the third aspect, determining that the fifth RNTI is associated with the third RNTI includes: determining, based on first indication information, that the fifth RNTI is associated with the third RNTI, where the first indication information is carried in the fourth DCI; determining, based on second indication information, that the fifth RNTI is associated with the third RNTI, where the second indication information is carried in higher layer signaling; or determining, based on a time window corresponding to the third RNTI, that the fifth RNTI is associated with the third RNTI.

According to the data receiving method provided in this embodiment, the terminal device may determine, in a plurality of manners, that the fifth RNTI is associated with the third RNTI, so that flexibility of the solution is improved.

With reference to the third aspect, in some implementations of the third aspect, the third RNTI is a second group radio network temporary identifier (G-RNTI), the fourth RNTI is a third G-RNTI, and the fifth RNTI is a second cell radio network temporary identifier (C-RNTI).

With reference to the third aspect, in some implementations of the third aspect, when a value of the first HPN domain is equal to a value of the third HPN domain, the method further includes: The terminal device determines, based on a value of the third NDI domain, that the fourth downlink data channel carries a newly transmitted data packet or carries a retransmitted data packet, or the terminal device determines, based on a value of the third NDI domain and a value of the first NDI domain, that the fourth downlink data channel carries a newly transmitted data packet or carries a retransmitted data packet, where the newly transmitted data packet is different from the data packet carried on the second downlink data channel, and the retransmitted data packet is the same as the data packet carried on the second downlink data channel.

According to the data receiving method provided in this embodiment, the terminal device may determine, in a plurality of manners, whether a data packet carried on the fourth downlink data channel is the retransmitted data packet carried on the second downlink data channel, so that flexibility of the solution is improved.

With reference to the third aspect, in some implementations of the third aspect, a value of the first HPN domain is equal to a value of the second HPN domain.

According to a fourth aspect, a data sending method is provided. The data sending method may be performed by a network device, or may be performed by a chip or a circuit disposed in a network device. This is not limited in this disclosure.

The data sending method includes:

Sending second downlink control information (DCI) to a terminal device, where the terminal device is configured to monitor the second DCI and third DCI, the second DCI is used to schedule a second downlink data channel, the third DCI is used to schedule a third downlink data channel, cyclic redundancy check (CRC) of the second DCI is scrambled by using a third radio network temporary identifier (RNTI), CRC of the third DCI is scrambled by using a fourth RNTI, the second DCI includes a first hybrid automatic repeat request process number (HPN) domain and a first new data indicator (NDI) domain, and the third DCI includes a second HPN domain and a second NDI domain; and sending fourth DCI to the terminal device, where the fourth DCI is used to schedule a fourth downlink data channel, CRC of the fourth DCI is scrambled by using a fifth RNTI, the fourth DCI includes a third HPN domain and a third NDI domain, and the fifth RNTI is associated with the third RNTI.

According to the data sending method provided in this embodiment, a data packet carried on a fifth downlink data channel that is scheduled by fifth DCI sent by the network device to the terminal device may determine, based on whether the fifth RNTI is associated with the third RNTI, whether the data packet carried on the fifth downlink data channel is a retransmitted data packet carried on the third downlink data channel, so that correct data transmission can be performed based on information in the DCI.

With reference to the fourth aspect, in some implementations of the fourth aspect, the method further includes: The fourth DCI carries first indication information, where the first indication information indicates that the fifth RNTI is associated with the third RNTI; or the method further includes: The network device sends higher layer signaling, where the higher layer signaling carries second indication information, and the second indication information indicates that the fifth RNTI is associated with the third RNTI.

According to the data sending method provided in this embodiment, the network device may indicate, in different manners, that the terminal device determines that the fifth RNTI is associated with the third RNTI, so that flexibility of the solution is improved.

With reference to the fourth aspect, in some implementations of the fourth aspect, the third RNTI is a second group radio network temporary identifier (G-RNTI), the fourth RNTI is a second G-RNTI2, and the fifth RNTI is a second cell radio network temporary identifier (C-RNTI).

With reference to the fourth aspect, in some implementations of the fourth aspect, when a value of the first HPN domain is equal to a value of the third HPN domain, a value of the third NDI domain is used to determine that the fifth downlink data channel carries a newly transmitted data packet or carries a retransmitted data packet, or a value of the third NDI domain and a value of the first NDI domain are used to determine that the fifth downlink data channel carries a newly transmitted data packet or carries a retransmitted data packet, where the newly transmitted data packet is different from the data packet carried on the third downlink data channel, and the retransmitted data packet is the same as the data packet carried on the third downlink data channel.

According to the data sending method provided in this embodiment, a plurality of manners may be used to determine whether a data packet carried on the fourth downlink data channel is a retransmitted data packet carried on the second downlink data channel, so that flexibility of the solution is improved.

With reference to the fourth aspect, in some implementations of the fourth aspect, a value of the first HPN domain is equal to a value of the second HPN domain.

According to the data sending method provided in this embodiment, a same HPN may be simultaneously used for a plurality of multicast RNTIs.

According to a fifth aspect, a data receiving apparatus is provided. The data receiving apparatus includes a processor, configured to implement functions of the terminal device in the methods described in the first aspect and the third aspect.

Optionally, the data receiving apparatus may further include a memory. The memory is coupled to the processor, and the processor is configured to implement functions of the terminal device in the methods described in the first aspect and the third aspect.

In a possible implementation, the memory is configured to store program instructions and data. The memory is coupled to the processor. The processor may invoke and execute the program instructions stored in the memory, to implement the functions of the terminal device in the methods described in the first aspect and the third aspect.

Optionally, the data receiving apparatus may further include a communication interface, and the communication interface is used by the data receiving apparatus to communicate with another device. When the data receiving apparatus is user equipment, the communication interface may be a transceiver, an input/output interface, a circuit, or the like.

In a possible design, the data receiving apparatus includes: a processor and a communication interface.

The processor is configured to run a computer program, so that the data receiving apparatus implements any method described in the first aspect or the third aspect.

The processor communicates with the outside by using the communication interface.

It may be understood that the outside may be an object other than the processor or an object other than the apparatus.

In another possible design, the data receiving apparatus is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

According to a sixth aspect, a data sending apparatus is provided. The data sending apparatus includes a processor, configured to implement functions of the network device in the methods described in the second aspect and the fourth aspect.

Optionally, the data sending apparatus may further include a memory. The memory is coupled to the processor, and the processor is configured to implement functions of the network device in the methods described in the second aspect and the fourth aspect.

In a possible implementation, the memory is configured to store program instructions and data. The memory is coupled to the processor. The processor may invoke and execute the program instructions stored in the memory, to implement functions of the network device in the methods described in the second aspect and the fourth aspect.

Optionally, the data sending apparatus may further include a communication interface, and the communication interface is used by the data sending apparatus to communicate with another device. When the data sending apparatus is a policy control network element, the communication interface may be a transceiver, an input/output interface, a circuit, or the like.

In a possible design, the data sending apparatus includes: a processor and a communication interface.

The processor communicates with the outside by using the communication interface.

The processor is configured to run a computer program, so that the data sending apparatus implements any method described in the second aspect or the fourth aspect.

It may be understood that the outside may be an object other than the processor or an object other than the apparatus.

In another possible design, the data sending apparatus is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

According to a seventh aspect, this disclosure provides a computer-readable storage medium. The computer-readable storage medium stores instructions, and when the instructions are run on a computer, the computer is enabled to perform the method according to the foregoing aspect.

According to an eighth aspect, this disclosure provides a computer program product including instructions. When the computer program product runs on a computer, the computer is enabled to perform the methods in the foregoing aspects.

According to a ninth aspect, a communication system is provided, including the data receiving apparatus shown in the fifth aspect and the data sending apparatus shown in the sixth aspect.

According to a tenth aspect, a chip apparatus is provided. The chip apparatus includes a processing circuit. The processing circuit is configured to invoke a program from a memory and run the program, to enable a communication device in which the chip apparatus is installed to perform the method according to any one of the possible implementations of the first aspect to the fourth aspect.

DESCRIPTION OF EMBODIMENTS

Figure 1:
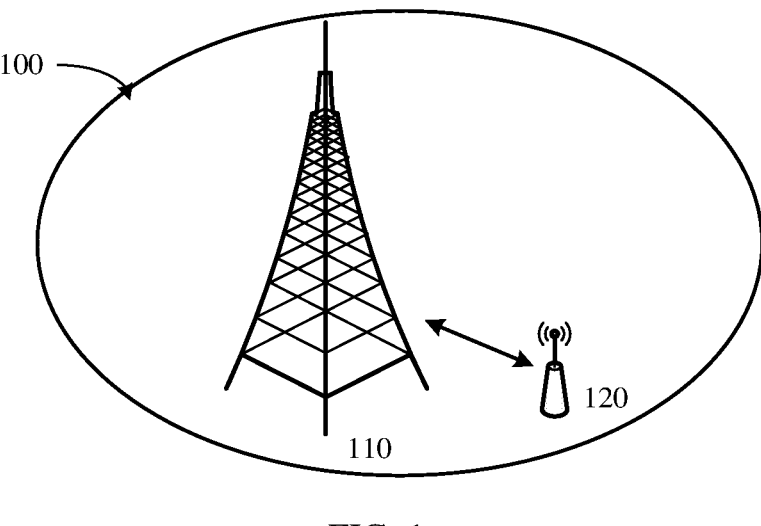
FIG. 1 is a schematic diagram of a communication system 100 applicable to an embodiment of this disclosure.

The following describes the technical solutions in this disclosure with reference to the accompanying drawings.

The technical solutions in embodiments of this disclosure may be applied to various communication systems, for example, a long term evolution (LTE) system, an LTE frequency division duplex (FDD) system, LTE time division duplex (TDD), a universal mobile telecommunication system (UMTS), a worldwide interoperability for microwave access (WiMAX) communication system, a 5G system, or new radio (NR). The technical solutions provided in this disclosure may be further applied to a future communication system, for example, a $6^{th}$ generation mobile communication system. Alternatively, the communication system may be a public land mobile network (PLMN), a device-to-device (D2D) communication system, a machine-to-machine (M2M) communication system, an internet of things (IoT) communication system, or another communication system.

A terminal device (terminal equipment) in embodiments of this disclosure may be an uncrewed aerial vehicle (UAV), an access terminal, a subscriber unit, a subscriber station, a mobile station, a relay station, a remote station, a remote terminal, a mobile device, a user terminal, user equipment (UE), a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile communication network (PLMN), a terminal device in a future internet of vehicles, or the like. This is not limited in embodiments of this disclosure.

By way of example rather than limitation, in embodiments of this disclosure, the wearable device may also be referred to as a wearable smart device, and is a generic term for wearable devices developed by intelligently designing daily wear by using a wearable technology, such as glasses, gloves, watches, clothes, and shoes. The wearable device is a portable device that can be directly worn by a user or integrated into clothes or an accessory of a user. The wearable device is more than a hardware device. The wearable device implements powerful functions through software support, data exchange, and cloud interaction. In a broad sense, the wearable smart device has full functions and a large size, and can implement all or partial functions without depending on a smartphone, for example, a smart watch, smart glasses, or the like. In addition, the wearable smart device focuses only on one type of application function, and needs to be used together with another device such as a smartphone, for example, various smart bands or smart jewelries that perform sign monitoring.

In addition, the terminal device in embodiments of this disclosure may alternatively be a terminal device in an IoT system. IoT is an important part of future development of information technologies. A main technical feature of the IoT is connecting a thing to a network by using communication technology, to implement an intelligent network for interconnection between a person and a machine or between things. In embodiments of this disclosure, an IoT technology may implement massive connections, deep coverage, and terminal power saving by using, for example, a narrow band (NB) technology.

In addition, in embodiments of this disclosure, the terminal device may further include a sensor such as an intelligent printer, a train detector, or a gas station. Main functions of the terminal device include collecting data (for some terminal devices), receiving control information and downlink data from a network device, sending an electromagnetic wave, and transmitting uplink data to the network device.

The network device in embodiments of this disclosure may be any communication device that has a wireless transceiver function and that is configured to communicate with the terminal device. The device includes but is not limited to an evolved NodeB (eNB), a radio network controller (RNC), a NodeB (NB), a base station controller (BSC), a base transceiver station (BTS), a home base station (home evolved NodeB, HeNB or home NodeB, HNB), a baseband unit (BBU), an access point (AP) in a wireless fidelity (Wi-Fi) system, a wireless relay node, a wireless backhaul node, a transmission point (TP), a transmission and reception point (TRP), or the like. Alternatively, the device may be a gNB or a transmission point (TRP or TP) in a 5G system such as an NR system; may be an antenna panel or a group of antenna panels (including a plurality of antenna panels) of a base station in a 5G system; or may be a network node, such as a baseband unit (BBU) or a distributed unit (DU), that constitutes a gNB or a transmission point.

In some deployments, the network device in embodiments of this disclosure may be a central unit (CU) or a DU, or the network device includes a CU and a DU. The gNB may further include an active antenna unit (AAU). The CU performs some functions of the gNB, and the DU performs some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be divided into a network device in a radio access network (RAN), or the CU may be classified into a network device in a core network (CN). This is not limited in this disclosure.

Further, the CU may be divided into a control plane central unit (CU-CP) and a user plane central unit (CU-UP). The CU-CP and the CU-UP may also be deployed on different physical devices. The CU-CP is responsible for a control plane function, and mainly includes the RRC layer and a PDCP-C layer. The PDCP-C layer is mainly responsible for data encryption and decryption, integrity protection, data transmission, and the like on a control plane. The CU-UP is responsible for a user plane function, and mainly includes an SDAP layer and a PDCP-U layer. The SDAP layer is mainly responsible for processing data of a core network and mapping a flow (flow) to a bearer. The PDCP-U layer is mainly responsible for at least one function of encryption and decryption, integrity protection, header compression, serial number maintenance, data transmission, and the like on a data plane. Specifically, the CU-CP and the CU-UP are connected through a communication interface (for example, an E1 interface). The CU-CP represents the network device and is connected to a core network device through a communication interface (for example, an Ng interface), and is connected to the DU through a communication interface (for example, an F1-C (control plane) interface). The CU-UP is connected to the DU through a communication interface (for example, an F1-U (user plane) interface).

In another possible implementation, the PDCP-C layer is also included in the CU-UP.

It may be understood that the foregoing protocol layer division between the CU and the DU, and protocol layer division between the CU-CP and the CU-UP are merely examples, and there may be another division manner. This is not limited in embodiments of this disclosure.

The network device mentioned in embodiments of this disclosure may be a device including a CU or a DU, a device including a CU and a DU, or a device including a control plane CU node (a CU-CP node), a user plane CU node (a CU-UP node), and a DU node.

The network device and the terminal device may be deployed on land, including indoor or outdoor devices, handheld devices, or vehicle-mounted devices; may be deployed on the water; or may be deployed on an airplane, a balloon, or a satellite in the air. Scenarios in which the network device and the terminal device are located are not limited in embodiment of this disclosure.

In embodiments of this disclosure, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software.

In addition, aspects or features of this disclosure may be implemented as a method, an apparatus, or a product that uses standard programming and/or engineering technologies. The term "product" used in this disclosure covers a computer program that can be accessed from any computer-readable component, carrier, or medium. For example, the computer-readable medium may include but is not limited to a magnetic storage device (for example, a hard disk, a floppy disk, or a magnetic tape), an optical disc (for example, a compact disc (CD) or a digital versatile disc (DVD)), a smart card, and a flash memory device (for example, an erasable programmable read-only memory (EPROM), a card, a stick, or a key drive). In addition, various storage media described in this specification may represent one or more devices and/or other machine-readable media that are configured to store information. The term "machine-readable storage media" may include but is not limited to a radio channel and various other media that can store, include, and/or carry instructions and/or data.

For ease of understanding embodiments of this disclosure, a communication system shown in FIG. 1 is first used as an example to describe in detail a communication system applicable to embodiments of this disclosure. FIG. 1 is a schematic diagram of a communication system 100 applicable to an embodiment of this disclosure. As shown in FIG. 1, the communication system 100 may include at least one network device, for example, a network device 110 shown in FIG. 1. The communication system 100 may further include at least one terminal device, for example, a terminal device 120 shown in FIG. 1. The network device 110 and the terminal device 120 may communicate with each other through a radio link. At least one antenna may be configured for each communication device such as the network device 110 or the terminal device 120. For each communication device in the communication system 100, the configured at least one antenna may include at least one transmit antenna configured to send a signal and at least one receive antenna configured to receive a signal. In a possible manner, the communication devices in the communication system 100, for example, the network device 110 and the terminal device 120, may communicate with each other by using a multi-antenna technology.

The network device 110 may communicate with the terminal devices 120. The terminal device 120 may receive a data channel and a control channel from the network device 110. The terminal device 120 may send feedback information of the data channel to the network device 110, for example, hybrid automatic repeat request (HARQ-ACK) information. The HARQ-ACK information may include an acknowledgment (acknowledgment, ACK), a negative-acknowledgment (NACK), information indicating another state, or the like.

It should be understood that FIG. 1 is merely a simplified schematic diagram for ease of understanding. The communication system 100 may further include another network device, for example, may further include a wireless relay device and a wireless backhaul device, or the communication system 100 may further include another terminal device that is not shown in FIG. 1.

For example, the communication system 100 may further include a core network device, and the network device 110 may be connected to the core network device in a wireless or wired manner. The core network device and the network device 110 may be different physical devices independent of each other; functions of the core network device and logical functions of the network device 110 may be integrated into a same physical device; or some functions of the core network device and some functions of the network device 110 may be integrated into one physical device.

For ease of understanding of embodiments of this disclosure, several basic concepts in embodiments of this disclosure are briefly described. It should be understood that basic concepts described below are briefly described by using a basic concept specified in an NR protocol as an example, but embodiments of this disclosure are not limited to being applied only to an NR system. Therefore, standard names appearing when the NR system is used as an example for description are all functional descriptions, and specific names are not limited. The names indicate only functions of a device, and may be correspondingly extended to another system, for example, a 2G, 3G, 4G, or future communication system.

1: Unicast

In 5G NR mobile communication release 15 and release 16, a concept of unicast scheduling is proposed. To be specific, a network device sends a single control channel to a scheduled single terminal device, to schedule a data service of the single terminal device. The network device separately sends control channels to different terminal devices, to separately schedule data services of the different terminal devices.

It should be noted that, generally, a downlink data transmission process is that a network device sends a physical downlink control channel (PDCCH) to a terminal device, and the PDCCH includes indication information such as a time-frequency resource of a physical downlink shared channel (PDSCH). It may be understood that the PDCCH is used to schedule the PDSCH, the PDSCH carries downlink data sent by the network device to the terminal device, and both the PDCCH and the PDSCH need to scramble cyclic redundancy check (CRC) of the PDCCH and the PDSCH by using RNTIs.

Specifically, for unicast scheduling, the PDCCH and the PDSCH that are sent by the network device to the terminal device are scrambled by using a cell radio network temporary identifier (C-RNTI). Each terminal device corresponds to one C-RNTI, and different terminal devices correspond to different C-RNTIs. The terminal device blindly detects the PDCCH. If the terminal device receives the PDCCH performing scrambling by using the C-RNTI corresponding to the terminal device, the terminal device determines that the network device sends a data service to the terminal device. Then, the terminal device receives, based on DCI, the data service scrambled by using the C-RNTI corresponding to the terminal device.

As described above, although the concept of unicast scheduling is proposed in release 15 and release 16, research on a wireless multicast (or referred to as "multicast" or "broadcast") data service has never stopped in recent years. There are a large quantity of mobile data multimedia services and various high-bandwidth multimedia services, for example, an internet protocol television (IPTV) and a mobile TV. Communication services of high robustness and extreme importance are provided, for example, group communication in a disaster situation and a public security network. This poses a higher requirement on a multicast data service. These mobile data multimedia services require a plurality of users to simultaneously receive the same data services. Compared with common data services, these services are characterized by a large data amount, long duration, sensitivity to latency, and the like.

The 3$^{rd}$ generation partnership project (3GPP) proposes a multimedia broadcast multicast service (MBMS), and supports providing a multicast network in a cellular system. The multimedia broadcast multicast service is a technology for transmitting data from one data source to a plurality of target mobile terminals, implements resource sharing between a core network and an access network, and improves utilization of a network resource (especially an air interface resource). The MBMS service defined in the 3GPP can implement low-rate plain-text message multicast, and implement high-speed multimedia service multicast, to provide various video, audio, and multimedia services. Characteristics of a multicast data service enable better efficiency in sending information of public interest, and this undoubtedly conforms to a trend of mobile data development in the future and provides a better business prospect for development of communication technologies.

The following briefly describes multicast and a multicast communication process.

2. Multicast

In 5G NR mobile communication release 17, multicast scheduling is supported. To be specific, a network device separately sends a control channel to a plurality of scheduled terminal devices, to schedule data services of the plurality of terminal devices. In addition, the data services of the plurality of terminal devices are the same.

For transmission of a multicast data service, a PDSCH sent by the network device scrambles CRC by using a group RNTI. The group RNTI may be referred to as a group radio network temporary identifier (G-RNTI). Different from the foregoing C-RNTI, the G-RNTI may be understood as an identifier shared by a group of terminal devices. To be specific, the group of terminal devices can receive a PDSCH whose CRC is scrambled by using the G-RNTI. Alternatively, a PDSCH may be scrambled by using a C-RNTI. Embodiments of this disclosure mainly relate to a manner in which the PDSCH is scrambled by using the G-RNTI.

3. Hybrid Automatic Repeat Request (HARQ)

The HARQ is a technology that combines a forward error correction (FEC) method and an automatic repeat request (ARQ) method. FEC enables a receive end to correct some errors by adding redundant information, to reduce a number of retransmissions. For an error that cannot be corrected through the FEC, the receive end requests, by using an ARQ mechanism, a transmit end to retransmit data. The receive end uses an error detection code, for example, CRC, to detect whether an error occurs in a received data packet. If no error occurs, the receive end sends an acknowledgment (ACK) to the transmit end. After receiving the ACK, the transmit end sends a next data packet. If an error occurs, the receive end sends a negative-acknowledgment (NACK) to the transmit end. After receiving the NACK, the transmit end retransmits the data packet. In a HARQ mechanism, a piece of data may be sent for a plurality of times. Data sent in the plurality of times may be different RVs of the data, and data rates, spatial domain information, and the like in the plurality of times of sending may also be different. The data sent for the plurality of times can be combined and decoded to obtain original data. In addition, the transmit end may also actively retransmit data without receiving the ACK/NACK sent by the receive end.

4. DAI Domain

In a mobile communication system, a DAI domain exists in DCI. The DAI domain includes a count downlink assignment indicator (C-DAI) and a total downlink assignment indicator (T-DAI). A dynamic codebook (Type-2) is determined based on C-DAI and T-DAI information in the DCI and HARQ configuration. A codebook size varies with an actual data scheduling status. The C-DAI refers to an accumulated quantity of PDSCHs by a current cell and a current detection occasion, and the T-DAI refers to a total quantity of PDSCHs by a current detection occasion. A value of a T-DCI in a last piece of DCI detected by a terminal device is a quantity of pieces of HARQ information included in the dynamic codebook, and a value of a C-DAI in a piece of DCI refers to a location that is of feedback information of a PDSCH indicated by the DCI and that is in the codebook.

A DAI mechanism is for synchronizing information about a quantity of scheduling times between a network device and a terminal device. The network device notifies, by using DAI domains in DCI, the terminal device of a quantity of pieces of sent DCI. The terminal device obtains the quantity of pieces of DCI by detecting the DAI domains in the DCI. If the terminal device loses a piece of DCI, there is a lost DAI in the DAI domains in the DCI received by the terminal device. In this way, the terminal device knows that the piece of DCI is lost. The terminal device sets a codebook corresponding to a PDSCH scheduled by the piece of DCI to NACK feedback, and then the network device performs retransmission.

It should be noted that, a PDCCH whose CRC is scrambled by using a C-RNTI may schedule a PDSCH whose CRC is scrambled by using a C-RNTI, and may further schedule a PDSCH whose CRC is scrambled by using a G-RNTI. A case in which the PDSCH whose CRC is scrambled by using the C-RNTI is scheduled may be understood as unicast scheduling, and a case in which the PDSCH whose CRC is scrambled by using the G-RNTI is scheduled may be understood as multicast scheduling. In this case, the terminal device may receive both unicast scheduling PDSCH data and multicast scheduling PDSCH data. Different hybrid automatic repeat request acknowledgment (HARQ-ACK) codebooks may be used in the unicast scheduling and the multicast scheduling. However, based on a value of a DAI domain included in DCI that is carried on a PDCCH, the terminal device cannot determine whether the DAI domain is used to count a unicast HARQ-ACK codebook or count a multicast HARQ-ACK codebook.

5. HARQ-ACK Codebook

When a terminal device organizes an HARQ-ACK bit sequence that needs to be reported at a feedback moment, the terminal device determines, based on a predefined rule and a scheduling status of physical downlink shared channel (PDSCH) transmission on one or more carriers that needs to report HARQ-ACK information at the feedback moment, a correspondence between each PDSCH transmission and one or more bits in the organized HARQ-ACK bit sequence. This operation is referred to as constructing an HARQ-ACK codebook.

When DCI indicates that a semi-persistent scheduling (SPS) PDSCH is released, the terminal device also needs to acknowledge, by using HARQ-ACK bits, receiving of the semi-persistent scheduling PDSCH, to ensure that both sides have a consistent understanding for whether the SPS PDSCH is in an activated state.

The HARQ-ACK codebook includes: a semi-static codebook (Type-1) and a dynamic codebook (Type-2). The semi-static codebook feeds back all possible DCI indications and PDSCH transmissions, is mainly used to ensure transmission reliability, and entails high feedback overheads. The dynamic codebook feeds back an actual DCI indication and PDSCH transmission, and entails low feedback overheads. However, transmission reliability is affected to some extent when DCI missing detection is common. In embodiments of this disclosure, when the terminal device needs to perform HARQ-ACK codebook feedback, the terminal device is configured to use a dynamic codebook.

The dynamic codebook reserves HARQ-ACK feedback bits for each actually used DAI value by performing DAI counting on an actually scheduled PDSCH transmission or SPS PDSCH release indicator. If the terminal device infers, by using another detected DAI, that PDSCH assignment indicators or SPS PDSCH release indicators corresponding to some DAIs are not received, the terminal device sets corresponding feedback bits to NACK. Alternatively, if the terminal device infers that PDSCH assignment indicators or SPS PDSCH release indicators corresponding to some DAIs are received, the terminal device sets, based on a decoding result of a PDSCH transmission corresponding to each PDSCH assignment indicator, HARQ-ACK feedback bits corresponding to the PDSCH assignment indicator, and sets feedback bits corresponding to the detected SPS PDSCH release indicators to ACK.

The DAI domain is indicated by using a limited quantity (currently, a single DAI generally occupies two bits) of bits. To extend an indication range of the DAI domain, a modulo operation is introduced. To be specific, counting is performed sequentially from 1, and then a modulo operation is performed to obtain a DAI value corresponding to a count value. In embodiments of this disclosure, specific forms of the DAI domain and the HARQ-ACK codebook are not limited. For details, refer to a specification in a current protocol, or refer to a specification in a future protocol.

6. HPN Domain

A communication process of downlink data includes: A network device sends a PDCCH, where the PDCCH includes indication information such as a time-frequency resource of the PDSCH. After receiving downlink data #1 sent by the network device, a terminal device needs to process the downlink data #1 for a period of time before sending, to the network device, feedback information corresponding to the downlink data #1. During the period of time, to improve resource utilization and data transmission efficiency, the network device may further schedule other data for the terminal device to transmit. However, because feedback information has not been sent for the previous downlink data #1, that is, the downlink data #1 may not be correctly transmitted, the network device may further need to retransmit the data. Therefore, the terminal device needs to simultaneously process the previously scheduled downlink data #1 and further process new data. In other words, the terminal device has a plurality of parallel processing pipelines to process data for a plurality of transmissions. Specifically, the terminal device has a maximum of 16 pipelines to process a maximum of 16 pieces of data transmitted in parallel, and the 16 processing lines are identified by using 16 HPNs.

The PDCCH sent by the network device to the terminal device includes indication information of DCI. The DCI includes an indicator domain, and the indicator domain indicates a value of an HPN. For example, if the indicator domain is 00, it indicates an HARQ process 0, or if the indicator domain is 01, it indicates an HARQ process 1. After receiving the PDCCH, the terminal device determines, based on the indicator domain, an HARQ process corresponding to the PDCCH. The terminal device may process, by using different processing lines, data with different HPNs.

In each HARQ process, a new data indicator (NDI) value is stored, and the value uses one bit to indicate whether scheduled data is newly transmitted or retransmitted. If an NDI value of a same HARQ process changes (NDI toggled) compared with a previous value, it indicates that a currently transmitted block is a new transport block (TB) that is initially transmitted. Alternatively, if an NDI value of a same HARQ process does not change (NDI not toggled) compared with a previous value, it indicates that a currently transmitted block is a same TB that is retransmitted. A TB is a basic data unit processed on a transmission channel at a MAC layer.

During channel encoding, if a size of a TB exceeds a maximum code block (CB) size supported by a system, the TB is divided into a plurality of CBs. For example, a maximum code block size supported in an NR system is 8448 bits. In addition, in the NR system, the plurality of CBs in the TB is grouped, and the grouped CBs are referred to as a code block group (CBG). A corresponding ACK/NACK is fed back for each CBG, and retransmission is performed based on the CBG. CBG transmission is configurable. Only a terminal device for which CBG-based transmission is configured can perform retransmission based on a CBG.

It should be noted that, when the terminal device supports simultaneous receiving of a plurality of multicast data services, PDSCH data of different multicast data services is scrambled by using different G-RNTIs. For example, the terminal device supports two multicast data services. PDSCH #1 data of the multicast data service is scrambled by using a G-RNTI #1, and PDSCH #2 data of the multicast data service is scrambled by using a G-RNTI #2. In a case in which an error occurs when the terminal device receives some pieces of initially transmitted (or may be referred to as newly transmitted) multicast data, for example, initially transmitted PDSCH #1 data that is of the multicast data service and that is scrambled by using the G-RNTI #1, the network device needs to use a PDCCH scrambled by using a C-RNTI, to schedule retransmission of the PDSCH #1. However, when blindly detecting the PDCCH for scheduling retransmission of the PDSCH #1, the terminal device does not know that the PDCCH is for scheduling the PDSCH #1, and the terminal device may alternatively consider that the network device schedules retransmission of the PDSCH #2. If the terminal device performs HARQ combination on the retransmitted data on the PDSCH #1 and initially transmitted data on the PDSCH #2, an error occurs when the terminal device receives combined PDSCH data. Alternatively, to avoid a PDSCH data receiving error, the terminal device separately receives the retransmitted data on the PDSCH #1 as initially transmitted data. In this case, the terminal device cannot perform HARQ combination on initially transmitted data of the PDSCH #1, that is, cannot obtain a HARQ combination gain, thereby affecting a system throughput.

7. FDRA Domain

An FDRA domain in DCI indicates a frequency domain resource assigned to a PDSCH.

For a downlink resource assignment type 0, a size of the FDRA domain is related to a quantity of resource block groups (RBG). An RBG is a set of virtual resource blocks (VRB), and includes P consecutive VRBs. A specific quantity of VRBs is determined by a higher layer parameter RBG-Size and a bandwidth part (BWP), as shown in the following Table 1.

TABLE 1

| Nominal RBG size P (Nominal RBG size P) | | |
|---|---|---|
| Bandwidth part size (bandwidth part size) | Configuration 1 (Configuration 1) | Configuration 2 (Configuration 2) |
| 1-36 | 2 | 4 |
| 37-72 | 4 | 8 |
| 73-144 | 8 | 16 |
| 145-275 | 16 | 16 |

A quantity of RBGs is represented as $N_{RBG}$, and a calculation formula of the quantity of RBGs is as follows:

$$N_{RBG} = \left\lceil \left( N_{BWP,i}^{size} + \left( N_{BWP,i}^{start} \bmod P \right) \right) / P \right\rceil,$$

where $$N_{BWP,i}^{start}$$

represents a number of a start RB of a BWP, and all RBG numbers in the BWP are arranged in ascending order from a low frequency; and $$N_{BWP,i}^{size}$$

represents a quantity of RBs included in the BWP.

For a downlink resource assignment type 1, a size of the FDRA domain is related to a size of a resource indicator value (RIV). The size of the RIV is as follows:

$$\lceil \log_2(N_{RB}^{DL,BWP}(N_{RB}^{DL,BWP}+1)/2)\rceil$$

The terminal device calculates, by using the RIV, a start RB on a PDSCH and a quantity of occupied RBs. Calculation formulas are as follows:

If $$(L_{RBs}-1)\le\lfloor N_{BWP}^{size}/2\rfloor,$$

$$RIV=N_{BWP}^{size}(L_{RBs}-1)+RB_{start};$$

otherwise, $$RIV=N_{BWP}^{size}(N_{BWP}^{size}-L_{RBs}+1)+(N_{BWP}^{size}-1-RB_{start}),$$

where $$L_{RBs}\ge 1, \text{ and } N_{BWP}^{size}-RB_{start}$$

should not be exceeded.

Regardless of whether a downlink resource indicator is the type 0 or the type 1, the size of the FDRA domain is related to a size of the downlink BWP, that is, the quantity of included RBs.

It should be noted that the terminal device may receive both a unicast scheduling data service and a multicast scheduling data service, and the terminal device and the network device need to align understandings for the FDRA domain in the DCI. For example, a PDCCH sent by the network device schedules multicast data, and an FDRA domain in DCI carried in the PDCCH corresponds to a frequency domain resource of a multicast BWP. The terminal device blindly detects the PDCCH, but does not know that the PDCCH schedules multicast data, but considers that unicast data is scheduled. In this case, the terminal device considers that the FDRA domain in the DCI corresponds to a frequency domain resource of a unicast BWP, and the terminal device obtains a start RB of a unicast PDSCH and a quantity of occupied RBs based on bit information of the FDRA domain. Finally, it is very likely that the terminal device cannot correctly receive the PDSCH on the unicast BWP, or even if the terminal device correctly receives the PDSCH on the unicast BWP, the received PDSCH is unicast data, and is not a multicast PDSCH scheduled by using the DCI sent by the network device. Consequently, a multicast data service cannot be normally received.

To resolve defects existing in the foregoing unicast scheduling and multicast scheduling processes, this disclosure provides a data transmission (including receiving and sending) method. Indication information is used to implicitly or explicitly indicate whether information included in DCI corresponds to transmission of a unicast data service or transmission of a multicast data service during specific application, so that the terminal device and the network device align understandings for the information included in the DCI.

It should be understood that the data transmission method provided in embodiments of this disclosure may be applied to a 5G communication system, for example, a communication system shown in FIG. 1.

Specific structures of execution bodies of the methods provided in embodiments of this disclosure are not particularly limited in the following embodiments, provided that a program that records codes of the methods provided in embodiments of this disclosure can be run to perform communication according to the methods provided in embodiments of this disclosure. For example, the methods provided in embodiments of this disclosure may be performed by the terminal device or the network device, or a functional module that can invoke and execute the program in the terminal device or the network device.

For ease of understanding of embodiments of this disclosure, the following descriptions are provided.

First, in this disclosure, "indicate" may be understood as "enabling", and "enabling" may include direct enabling and indirect enabling. When a piece of information is described to enable A, the information may directly enable A or indirectly enable A, and this does not necessarily mean that the information carries A.

Information enabled by another piece of information is referred to as to-be-enabled information. In a specific implementation process, the to-be-enabled information is enabled in a plurality of manners. For example but not limited to, the to-be-enabled information, for example, the to-be-enabled information itself or an index of the to-be-enabled information, may be directly enabled. Alternatively, the to-be-enabled information may be indirectly enabled by enabling another piece of information, where an association relationship exists between the another piece of information and the to-be-enabled information. Alternatively, only a part of the to-be-enabled information may be enabled, and another part of the to-be-enabled information is known or agreed on in advance. For example, specific information may be enabled by using a pre-agreed (for example, specified in a protocol) arrangement sequence of pieces of information, to reduce enabling overheads to some extent. In addition, common parts in the pieces of information may be identified and enabled in a unified manner, to reduce enabling overheads caused by separately enabling same information.

Second, "first", "second", and various numerical numbers (for example, "#1", and "#2") shown in this disclosure are merely for ease of description, and are used to distinguish between objects, but are not intended to limit the scope of embodiments of this disclosure. For example, the terms are used to differentiate between different indication information, but are not used to describe a particular order or sequence. It should be understood that objects described in this way are interchangeable in a proper circumstance, so that a solution other than embodiments of this disclosure can be described.

Third, in this disclosure, "preset" may include "predefined", for example, defined in a protocol. "Being predefined" may be implemented by prestoring a corresponding code or a corresponding table in a device (for example, including a terminal device or a network device) or in another manner that may indicate related information. A specific implementation of "being predefined" is not limited in this disclosure.

Fourth, "being stored" in embodiments of this disclosure may be "being stored in one or more memories". The one or more memories may be separately disposed, or may be integrated into an encoder or a decoder, a processor, or a communication apparatus. Alternatively, some of the one or more memories may be separately disposed, and some of the one or more memories are integrated into a decoder, a processor, or a communication apparatus. A type of the memory may be a storage medium in any form. This is not limited in this disclosure.

Fifth, "protocols" in embodiments of this disclosure may be standard protocols in the communication field, for example, may include a 5G protocol, a new radio (NR) protocol, and a related protocol used for a future communication system. This is not limited in this disclosure.

Sixth, in embodiments of this disclosure, a control channel may include another physical layer control channel such as a PDCCH or an enhanced physical downlink control channel (EPDCCH). However, for ease of description, the following terms or concepts are described by using only the PDCCH as an example. However, embodiments of this disclosure are not limited thereto.

It should be understood that, in embodiments of this disclosure, an example in which the downlink control channel is the physical downlink control channel PDCCH is used for description, but this does not constitute a limitation on embodiments of this disclosure. Actually, the downlink control channel may alternatively be defined as another term or concept, which is applicable to technical solutions in embodiments of this disclosure. In embodiments of this disclosure, the downlink control channel and the PDCCH may be alternately used. It may be considered that the PDCCH is an example description of the downlink control channel.

Seventh, it should be further understood that, in embodiments of this disclosure, the PDSCH is used as an example for description, but this does not constitute a limitation on embodiments of this disclosure. Actually, the downlink shared channel may alternatively be defined as another term or concept, which is applicable to technical solutions in embodiments of this disclosure. In the embodiments of this disclosure, the downlink shared channel and the PDSCH may be alternately used. It may be considered that the PDSCH is an example description of the downlink shared channel.

Without loss of generality, the following uses interaction between the terminal device and the network device as an example to describe in detail the data transmission method provided in embodiments of this disclosure.

Figure 2:
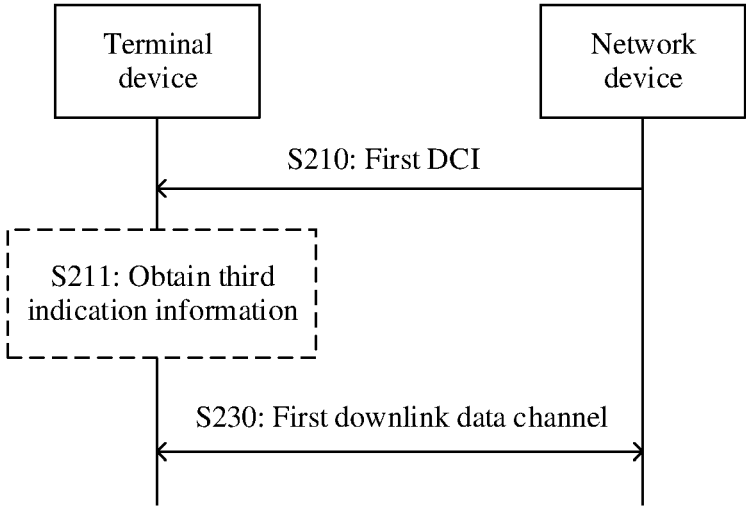
FIG. 2 is a schematic flowchart of a data transmission method according to an embodiment of this disclosure.

FIG. 2 is a schematic flowchart of a data transmission method according to an embodiment of this disclosure. The method includes at least the following steps.

S210: A network device sends first DCI to a terminal device (or a terminal device receives first DCI from a network device).

Cyclic redundancy check CRC of the first DCI is scrambled by using a first RNTI, and is used to schedule a first downlink data channel. The first downlink data channel is scrambled by using a second RNTI. In this embodiment, a value of the first RNTI is different from a value of the second RNTI. That a network device sends first DCI to a terminal device may be understood as the following: The network device sends a control channel to the terminal device, where the control channel carries the first DCI, and the control channel is scrambled by using the first RNTI.

The first downlink data channel is scheduled in a public frequency resource, the public frequency resource is configured in a bandwidth part (BWP), and the BWP is a dedicated BWP configured for a terminal device.

Specifically, the first DCI includes a DAI domain and/or an FDRA domain. For detailed descriptions of the DAI domain and the FDRA domain, refer to the foregoing descriptions.

The value of the first RNTI is different from the value of the second RNTI. Therefore, after receiving the first DCI, the terminal device cannot accurately learn whether the DAI domain in the first DCI is used to count a first HARQ-ACK codebook corresponding to the first RNTI or used to count a second HARQ-ACK codebook corresponding to the second RNTI.

In this disclosure, two technical solutions are provided, to determine a function of the DAI domain in the first DCI.

Solution 1: The Function of the DAI Domain in the First DCI is Predefined in a Protocol.

For example, the DAI domain indicates a count of first HARQ-ACK information in the first HARQ-ACK codebook, where the first HARQ-ACK information corresponds to the first downlink data channel, and the first HARQ-ACK codebook corresponds to the first RNTI.

Alternatively, it is as follows.

For example, the DAI domain indicates a count of first HARQ-ACK information in the first HARQ-ACK codebook, where the first HARQ-ACK information corresponds to the first downlink data channel, and the first HARQ-ACK codebook corresponds to the second RNTI.

In addition, when the control channel scrambled by using the second RNTI schedules the downlink data channel scrambled by using the second RNTI, HARQ-ACK information corresponding to the downlink data channel is second HARQ-ACK information, and a codebook including the second HARQ-ACK information is a second HARQ-ACK codebook. The first HARQ-ACK codebook and the second HARQ-ACK codebook are generated independently, or the first HARQ-ACK codebook and the second HARQ-ACK codebook are connected in series after being generated independently, or the first HARQ-ACK codebook and the second HARQ-ACK codebook are generated independently and then one of the codebooks is discarded.

Solution 2: The Function of the DAI Domain in the First DCI is Notified Dynamically.

In this solution, the terminal device needs to obtain third indication information, and determine the function of the DAI domain based on the third indication information. In this case, in Solution 2, the method process shown in FIG. 2 further includes the following step.

S211: The terminal device obtains the third indication information.

The third indication information indicates that the DAI domain indicates a count of first HARQ-ACK information in the first HARQ-ACK codebook, where the first HARQ-ACK information corresponds to the first downlink data channel, and the first HARQ-ACK codebook corresponds to the first RNTI.

Alternatively, it is as follows.

The third indication information indicates that the DAI domain indicates a count of first HARQ-ACK information in the first HARQ-ACK codebook, where the first HARQ-ACK information corresponds to the first downlink data channel, and the first HARQ-ACK codebook corresponds to the second RNTI.

For example, that the third indication information indicates the function of the DAI domain includes the following two possibilities.

The value of the first RNTI is different from the value of the second RNTI. Therefore, after receiving the first DCI, the terminal device cannot accurately learn whether the FDRA domain in the first DCI indicates, within a frequency domain range of a public frequency resource, a scheduled frequency domain resource on the first downlink data channel, or indicates, within a frequency domain range of a BWP, a scheduled frequency domain resource on the first downlink data channel.

In this disclosure, two technical solutions are provided, to determine a function of the FDRA domain in the first DCI. Solution 1: The Function of the FDRA Domain in the First DCI is Predefined in a Protocol.

For example, the FDRA domain indicates, within the frequency domain range of the public frequency resource, the scheduled frequency domain resource on the first downlink data channel.

Alternatively, it is as follows.

For example, the FDRA domain indicates, within the frequency domain range of the BWP, the scheduled frequency domain resource on the first downlink data channel. Solution 2: The Function of the FDRA Domain in the First DCI is Notified Dynamically.

In this solution, the terminal device needs to obtain third indication information, and determine the function of the FDRA domain based on the third indication information.

For example, the third indication information indicates that the FDRA domain indicates, within the frequency domain range of the public frequency resource, the scheduled frequency domain resource on the first downlink data channel.

Alternatively, it is as follows.

For example, the third indication information indicates that the FDRA domain indicates, within the frequency domain range of the BWP, the scheduled frequency domain resource on the first downlink data channel.

Further, a corresponding quantity of bits obtained when the FDRA domain is parsed based on the frequency domain range of the BWP is a first value, and a corresponding quantity of bits obtained when the FDRA domain is parsed based on the frequency domain range of the public frequency resource is a second value FDRA First resource pool. The FDRA domain corresponds to a first bit sequence.

When the first value is greater than the second value, a part of bits in the first bit sequence form a second bit sequence.

Alternatively, when the first value is less than the second value, the first bit sequence is padded with at least one bit to form a second bit sequence.

A quantity of bits included in the second bit sequence is equal to the second value. The second bit sequence is used to parse, within the frequency domain range of the public frequency resource, the scheduled frequency domain resource on the first downlink data channel.

For example, the first RNTI is a first cell radio network temporary identifier (C-RNTI), and the second RNTI is a first group radio network temporary identifier (G-RNTI).

Specifically, after receiving the first DCI and learning a function of the DAI domain and/or the FDRA domain included in the first DCI, the terminal device can receive the first downlink data channel based on the first DCI. In this case, the method process shown in FIG. 2 further includes the following step.

S220: The terminal device receives the first downlink data channel.

It should be understood that this embodiment mainly relates to a function of correctly learning information in the first DCI. How the terminal device receives the downlink data channel based on the first DCI is not limited. For details, refer to related descriptions of how a terminal device receives downlink data after correctly parsing DCI in an existing protocol.

Further, the terminal device may be further configured to monitor second DCI and third DCI.

For example, that the terminal device is configured to monitor the second DCI and the third DCI includes the following possibilities.

Possibility 1:

The terminal device receives higher layer signaling, where the higher layer signaling indicates the terminal device to monitor the second DCI and the third DCI. In other words, the terminal device is configured by the higher layer signaling (for example, RRC signaling) to monitor the second DCI and the third DCI.

For example, when a first field exists in RRC, it indicates that the terminal device may monitor DCI corresponding to at least two group radio network temporary identifiers.

Alternatively, a value corresponding to the first field in the RRC indicates DCI corresponding to a group radio network temporary identifier that can be monitored by a terminal. For example, if the first field is 10, and a corresponding value is 2, it indicates that the terminal can monitor DCI corresponding to two group radio network temporary identifiers.

Alternatively, a value of each bit in the first field in the RRC indicates whether the terminal device monitors DCI corresponding to a group radio network temporary identifier that corresponds to the bit. For example, the first field is 101, three bits in the first field are respectively corresponding to three group radio network temporary identifiers, 0 represents that the terminal device does not support monitoring of the DCI corresponding to the group radio network temporary identifier that corresponds to the bit, and 1 represents that the terminal device supports monitoring of the DCI corresponding to the group radio network temporary identifier that corresponds to the bit. In this case, the terminal device supports monitoring of DCI corresponding to group radio network temporary identifiers that correspond to a first bit and a third bit. In other words, the terminal is configured to monitor DCI corresponding to two group radio network temporary identifiers.

Possibility 2:

The terminal device determines, based on capability information, to monitor the second DCI and the third DCI.

For example, the terminal device capability information reported by the terminal device includes a quantity of pieces of DCI that correspond to group radio network temporary identifiers and that may be monitored by the terminal device. If the quantity of pieces of DCI that correspond to group radio network temporary identifiers and that may be monitored by the terminal device is greater than or equal to 2, the terminal device determines that the terminal device may monitor pieces of DCI corresponding to at least two group radio network temporary identifiers.

Figure 3:
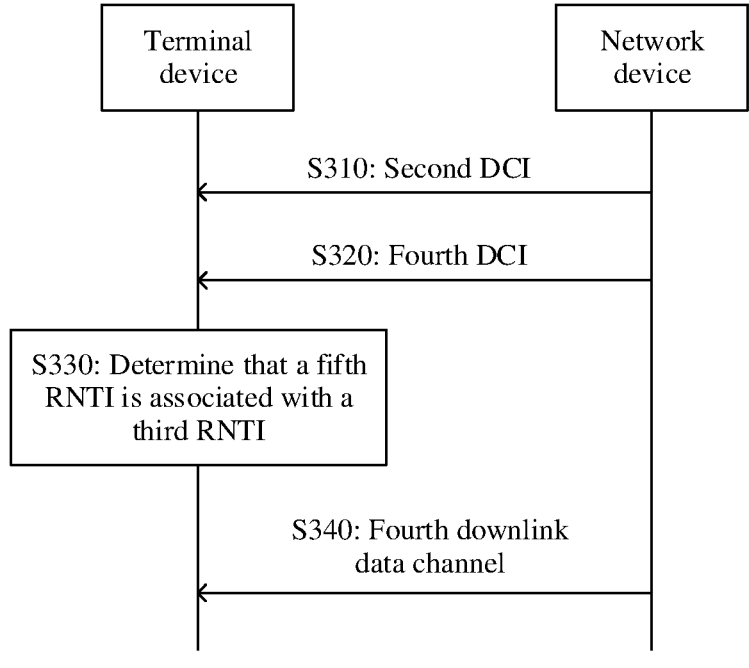
FIG. 3 is a schematic flowchart of another data transmission method according to an embodiment of this disclosure.

With reference to FIG. 3, the following describes how the terminal device determines whether a received data packet carried on a downlink data channel is a retransmitted data packet in a scenario in which the terminal device monitors the second DCI and the third DCI.

FIG. 3 is a schematic flowchart of another data transmission method according to an embodiment of this disclosure. The method shown in FIG. 3 includes the following step.

S310: A network device sends second DCI to a terminal device (or a terminal device receives second DCI from a network device).

The second DCI is used to schedule a second downlink data channel, the third DCI is used to schedule a third downlink data channel, CRC of the second DCI is scrambled by using a third RNTI, and CRC of the third DCI is scrambled by using a fourth RNTI. The second DCI includes a first HPN domain and a first NDI domain. The third DCI includes a second HPN domain and a second NDI domain.

In a possible implementation, the first HPN domain and the second HPN domain may be equal. It may be understood that a same HPN may be simultaneously used between a plurality of RNTIs.

Further, in this embodiment, the terminal device may receive a retransmitted data packet carried on a first downlink data channel, and determine that the received data packet is a retransmitted data packet. The method shown in FIG. 3 includes the following step.

S320: The network device sends fourth DCI to the terminal device (or the terminal device receives fourth DCI from the network device).

The fourth DCI is used to schedule a fourth downlink data channel, CRC of the fourth DCI is scrambled by using a fifth RNTI, and the fourth DCI includes a third HPN domain and a third NDI domain.

Specifically, after receiving the fourth DCI, the terminal device determines, based on whether the fifth RNTI and the third RNTI that respectively correspond to the fourth DCI and the second DCI are associated, a relationship between a data packet carried on the fourth downlink data channel and a data packet carried on the second downlink data channel. The method shown in FIG. 3 includes the following step.

S330: The terminal device determines that the fifth RNTI is associated with the third RNTI.

The terminal device may determine, based on whether the fifth RNTI is associated with the third RNTI, whether the data packet carried on the fourth downlink data channel is the retransmitted data packet carried on the second downlink data channel.

In this embodiment, the fifth RNTI is associated with the third RNTI, and the fifth RNTI is not associated with the fourth RNTI.

When the data packet carried on the fourth downlink data channel is the retransmitted data packet carried on the second downlink data channel, the fifth RNTI is associated with the third RNTI.

Optionally, the terminal device determines an association relationship, where the association relationship indicates that the fifth RNTI is associated with the third RNTI.

In a possible implementation, the third RNTI is a second G-RNTI, the fourth RNTI is a third G-RNTI, and the fifth RNTI is a second C-RNTI. It may be understood that manners of new transmission and retransmission of the data packet carried on the second downlink data channel may be different. For example, new transmission is in a multicast manner, and retransmission is in a unicast manner; or new transmission is in a unicast manner, and retransmission is in a multicast manner.

It should be understood that manners of new transmission and retransmission of the data packet may alternatively be the same.

For example, that the terminal device determines that the fifth RNTI is associated with the third RNTI includes the following several possibilities.

Possibility 1: The terminal device determines, based on first indication information, that the fifth RNTI is associated with the third RNTI, where the first indication information is carried in the fourth DCI.

For example, when a value of the first indication information is 0, it is determined that the fifth RNTI is associated with the third RNTI; or when a value of the first indication information is 1, it is determined that the fifth RNTI is not associated with the third RNTI.

Possibility 2: The terminal device determines, based on second indication information, that the fifth RNTI is associated with the third RNTI, where the second indication information is carried in higher layer signaling.

Possibility 3: The terminal device determines, based on a time window corresponding to the third RNTI, that the fifth RNTI is associated with the third RNTI.

For example, the terminal device receives, in a specific time window, only a downlink data channel corresponding to one service.

In a time window 1, the terminal device receives only a downlink data channel corresponding to a data packet #1. The second downlink data channel carries the newly transmitted data packet #1, is scrambled by using the third RNTI, and uses a HARQ process numbered 0. The fourth downlink data channel carries the retransmitted data packet #1, is scrambled by using the fifth RNTI, and may also use the HARQ process numbered 0.

The time window may be a positive integer multiple of a slot, a sub-frame, or a frame. The time window may be configured by using higher layer signaling, for example, configured by using RRC signaling or DCI.

For example, when a value of the first HPN domain is equal to a value of the third HPN domain, that the terminal device determines that the fourth downlink data channel carries a newly transmitted data packet or carries a retransmitted data packet includes the following several possibilities.

Possibility 1:

The terminal device determines, based on a value of the third NDI domain, that the fourth downlink data channel carries a newly transmitted data packet or carries a retransmitted data packet.

For example, when a value of the third NDI domain is 0, the fourth downlink data channel carries a newly transmitted data packet; or when a value of the third NDI domain is 1, the fourth downlink data channel carries a retransmitted data packet. Alternatively, another possible manner may be used.

Possibility 2:

The terminal device determines, based on a value of the third NDI domain and a value of the first NDI domain, that the fourth downlink data channel carries a newly transmitted data packet or carries a retransmitted data packet.

For example, if the value of the third NDI domain is reversed with the value of the first NDI domain (for example, the value of the first NDI domain is 0, and the value of the third NDI domain is 1; or the value of the first NDI domain is 1, and the value of the third NDI domain is 0), the fourth downlink data channel carries a newly transmitted data packet. Alternatively, if the value of the third NDI domain is the same as the value of the first NDI domain, the fourth downlink data channel carries a retransmitted data packet.

It should be understood that the newly transmitted data packet is different from a data packet carried on the second downlink data channel, and the retransmitted data packet is the same as the data packet carried on the second downlink data channel.

Further, after determining that the fifth RNTI is associated with the third RNTI, the terminal device learns that the data packet carried on the fourth downlink data channel is the retransmitted data packet carried on the second downlink data channel. The method shown in FIG. 3 includes the following step.

S340: The terminal device receives the fourth downlink data channel.

It should be understood that, in this embodiment, on a premise that the terminal device determines, based on association between the fifth RNTI and the third RNTI, that the data packet carried on the fourth downlink data channel is the retransmitted data packet carried on the second downlink data channel, when the terminal device receives the retransmitted data packet carried on the fourth downlink data channel, HARQ combination may be performed on the retransmitted data packet carried on the fourth downlink data channel and the initially transmitted data packet carried on the second downlink data channel, to obtain a HARQ combination gain and increase a system throughput.

Specifically, the data receiving method provided in this disclosure may be applied to a scenario in which the terminal device supports receiving of both a unicast service data service and at least one multicast service data service. The network device and the terminal device need to align whether the DAI domain in the DCI is used to count an HARQ-ACK codebook when a unicast data service is received or is used to count an HARQ-ACK codebook when a multicast data service is received.

Similarly, the network device and the terminal device need to align whether the HPN domain in the DCI is used for management of an HARQ process when a unicast data service is received or is used for management of an HARQ process when a multicast data service is received, and whether the FDRA domain is used to determine, when a unicast data service is received, a frequency domain resource occupied by a data channel, or is used to determine, when a multicast data service is received, a frequency domain resource occupied by a data channel.

The following describes how to dynamically notify functions of the DAI domain, the HPN domain, and the FDRA domain in the DCI by using an example in which the terminal device supports receiving of a unicast data service and at least one multicast data service and learns the functions of the DAI domain, the HPN domain, and the FDRA domain in the DCI based on third indication information.

Figure 4:
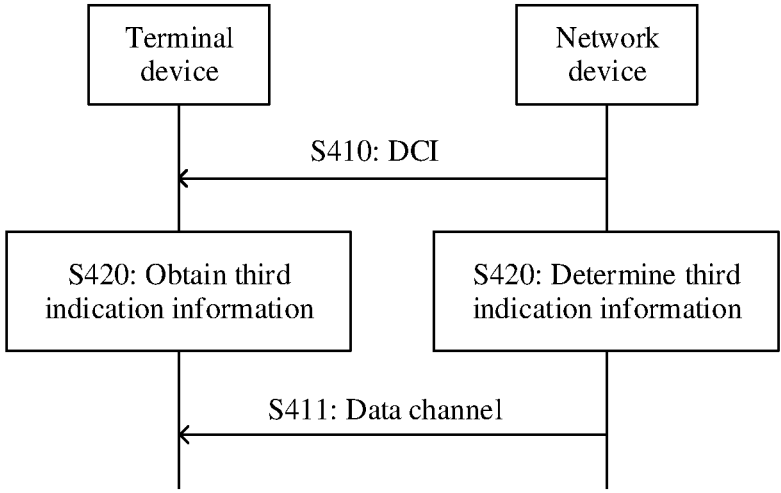
FIG. 4 is a schematic flowchart of still another data transmission method according to an embodiment of this disclosure.

FIG. 4 is a schematic flowchart of still another data transmission method according to an embodiment of this disclosure. At least some of the following steps are included.

S410: A network device sends DCI to a terminal device.

The network device sends a control channel to the terminal device. The control channel carries the DCI. In this embodiment, the control channel is scrambled by using a first identifier, and is used to schedule a data channel that carries a data service.

Specifically, the DCI includes at least one of a DAI domain, an HPN domain, and an FDRA domain. For detailed descriptions of the DAI domain, the HPN domain, and the FDRA domain, refer to the foregoing descriptions.

It can be learned from the foregoing that the network device and the terminal device need to align whether the DAI domain in the DCI is used to count an HARQ-ACK codebook when a unicast data service is received or is used to count an HARQ-ACK codebook when a multicast data service is received.

Similarly, the network device and the terminal device need to align whether the HPN domain in the DCI is used for management of an HARQ process when a unicast data service is received or is used for management of an HARQ process when a multicast data service is received, and whether the FDRA domain is used to determine, when a unicast data service is received, a frequency domain resource occupied by a data channel, or is used to determine, when a multicast data service is received, a frequency domain resource occupied by a data channel.

To align understandings for information included in the DCI, for the terminal device, the data transmission method provided in this embodiment further includes S420: The terminal device obtains third indication information. Alternatively, for the network device, the data transmission method further includes S420: The network device determines third indication information.

The third indication information indicates at least one of the following.

The DAI domain is used to count a hybrid automatic repeat request-acknowledgment (HARQ-ACK) codebook when the unicast data service or the first multicast data service is received.

Alternatively, the HPN domain is used for management of a hybrid automatic repeat request (HARQ) process when the unicast data service or the first multicast data service is received.

Alternatively, the FDRA domain is used to determine, when the unicast data service or the first multicast data service is received, a frequency domain resource occupied by a data channel.

The first multicast data service is any one of the at least one multicast data service.

A specific application in which the third indication information indicates the information included in the DCI A includes the following two possibilities:

Possibility 1: Indirect Indication.

For example, in Possibility 1, the third indication information may indirectly indicate, by indicating a scrambling identifier of a data channel that carries a data service, whether the DAI domain, the HPN domain, and the FDRA domain correspond to transmission of a unicast data service or transmission of a multicast data service during specific application.

For example, the third indication information indicates the first identifier for scrambling a data channel that carries the unicast data service, or indicates a second identifier for scrambling a data channel that carries the first multicast data service.

When the third indication information indicates the first identifier, the DAI domain is used to count an HARQ-ACK codebook when the unicast data service is received.

Alternatively, when the third indication information indicates the second identifier, the DAI domain is used to count an HARQ-ACK codebook when the first multicast data service is received.

When the third indication information indicates the first identifier, the HPN domain is used for management of an HARQ process when the unicast data service is received.

Alternatively, when the third indication information indicates the second identifier, the HPN domain is used for management of an HARQ process when the first multicast data service is received.

When the third indication information indicates the first identifier, the FDRA domain is used to determine, when the unicast data service is received, a frequency domain resource occupied by a data channel.

Alternatively, when the third indication information indicates the second identifier, the FDRA domain is used to determine, when the first multicast data service is received, a frequency domain resource occupied by a data channel.

In this embodiment, the first identifier is an identifier used to scramble a control channel in a unicast scheduling manner and a multicast scheduling manner, and the first identifier may be further used to scramble a data channel in the unicast scheduling manner.

For example, the first identifier may be a C-RNTI, or the first identifier may be another identifier that can be used to scramble a control channel and a data channel in the unicast scheduling manner.

The second identifier is an identifier that is in at least one third identifier and that is used to scramble a data channel that carries the first multicast data service. The at least one third identifier is used to scramble at least one data channel, and the at least one data channel is used to carry the at least one piece of multicast service data.

For example, the first identifier may be a G-RNTI, or the second identifier may be another identifier that may be used to scramble a data channel in a multicast scheduling manner.

It should be noted that, that the control channel is scrambled by using the first identifier in this embodiment should be understood as follows: CRC of the control channel is scrambled by using the first identifier. Similarly, that the data channel is scrambled by using the first identifier or the second identifier should be understood as follows: CRC of the data channel is scrambled by using the first identifier or the second identifier. For ease of description, the following directly describes that the control channel is scrambled by using the first identifier, and the data channel is scrambled by using the first identifier or the second identifier.

For example, if the control channel is a PDCCH, and the data channel is a PDSCH, downlink data is data carried on the PDSCH. The downlink data may alternatively be referred to as a data service, PDSCH data, or the like.

In this embodiment, how the control channel is used to schedule the data channel is not limited. For a case in which the data channel is scheduled in the unicast scheduling manner, refer to a unicast scheduling manner of a network device in a current protocol. For a case in which the data channel is scheduled in the unicast/multicast scheduling manner, refer to a multicast scheduling manner of a network device in a current protocol. According to the method provided in this embodiment, the terminal device can determine a scrambling identifier of a data channel in different transmission manners based on the third indication information.

For example, the terminal device supports receiving of to-be-received downlink data in the unicast manner and the multicast manner.

For example, the terminal device may receive a data channel that carries a multicast data service #1 and that is scrambled by using a third identifier #1, may further receive a data channel that carries a multicast data service #2 and that is scrambled by using a third identifier #2, may further receive a data channel that carries a multicast data service #3 and that is scrambled by using a third identifier #3, and may further receive a data channel that carries a unicast data service and that is scrambled by using the first identifier. A downlink data transmission process includes: The network device sends, to the terminal device, a control channel scrambled by using the first identifier, and then sends, to the terminal device, a data channel scrambled by using the first identifier or the second identifier. The second identifier may be any one of the third identifier #1, the third identifier #2, and the third identifier #3.

After receiving the control channel and before descrambling the data channel, the terminal device can determine, based on indication information, the first identifier or the second identifier for scrambling the data channel.

The following uses an example to describe how the third indication information indicates the first identifier or the second identifier.

Figure 5:
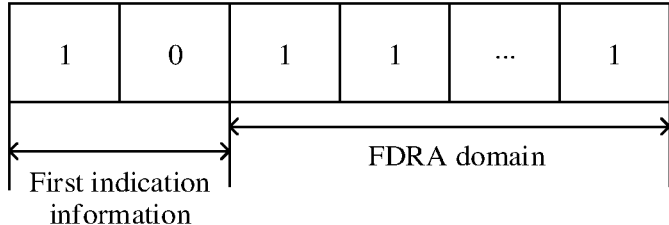
FIG. 5 is a schematic diagram of DCI carrying third indication information according to an embodiment of this disclosure.

Example 1: The Third Indication Information Explicitly Indicates a Scrambling Identifier of the Data Channel In Example 1, the third indication information is carried in DCI, and the DCI is carried on the control channel. FIG. 5 is a schematic diagram of DCI carrying third indication information according to an embodiment of this disclosure.

It can be learned from FIG. 5 that the third indication information in the DCI is located before an FDRA domain. This may be understood as follows: A quantity of bits of the third indication information in bits of the DCI is greater than a quantity of bits of the FDRA domain. For example, as shown in FIG. 5, bit information corresponding to the third indication information is 1 0, and bit information corresponding to the FDRA domain is 1 1 . . . 1.

Optionally, the most significant bit of the third indication information is the most significant bit in the DCI.

It should be understood that FIG. 5 is merely an example for describing a possible case in which the third indication information is carried in the DCI, and does not constitute any limitation on the protection scope of this disclosure. The third indication information may alternatively be located in another location in the DCI, for example, after the FDRA domain.

Optionally, the third indication information is an N-bit field, and N is a positive integer.

When the N-bit field is a first value, the third indication information indicates that the scrambling identifier of the data channel is the first identifier.

Alternatively, when the N-bit field is a second value, the third indication information indicates that the scrambling identifier of the data channel is the second identifier.

The second value is a value that is in at least one third value and that indicates the second identifier. The at least one third value corresponds to the at least one third identifier.

For example, the at least one third value is sorted in ascending order, and the at least one third identifier respectively corresponding to the at least one third value is also sorted in ascending order. For example, the at least one third value includes a third value #1, a third value #2, and a third value #3, where the third value #1 is less than the third value #2, and the third value #2 is less than the third value #3. The third value #1 corresponds to the third identifier #1, the third value #2 corresponds to the third identifier #2, and the third value #3 corresponds to the third identifier #3. In this case, the third identifier #1 is less than the third identifier #2, and the third identifier #2 is less than the third identifier #3.

For example, the at least one third value is sorted in descending order, and the at least one third identifier respectively corresponding to the at least one third value is also sorted in descending order. For example, the at least one third value includes a third value #1, a third value #2, and a third value #3, where the third value #1 is greater than the third value #2, and the third value #2 is greater than the third value #3. The third value #1 corresponds to the third identifier #1, the third value #2 corresponds to the third identifier #2, and the third value #3 corresponds to the third identifier #3. In this case, the third identifier #1 is greater than the third identifier #2, and the third identifier #2 is greater than the third identifier #3.

For ease of understanding, the following uses an example in which N is 1 or N is 2 to describe how the third indication information indicates the first identifier or the second identifier when the third indication information is the N-bit field.

N=1:

Manner 1: If a 1-bit field is empty, the first identifier is indicated; or if a 1-bit field is not empty, the second identifier is indicated.

Manner 2: If a 1-bit field is empty, the second identifier is indicated; or if a 1-bit field is not empty, the first identifier is indicated.

Manner 3: If a 1-bit field is not empty, and a value of the 1-bit field is 0, the first identifier is indicated; or if a 1-bit field is not empty, and a value of the 1-bit field is 1, the second identifier is indicated.

Manner 4: If a 1-bit field is not empty, and a value of the 1-bit field is 0, the second identifier is indicated; or if a 1-bit field is not empty, and a value of the 1-bit field is 1, the first identifier is indicated.

Manner 5: If a 1-bit field is empty, the first identifier is indicated; if a 1-bit field is not empty, and a value of the 1-bit field is 0, the third identifier #1 is indicated; or if a 1-bit field is not empty, and a value of the 1-bit field is 1, the third identifier #2 is indicated.

In Manner 5, the second identifier may be the third identifier #1 or the third identifier #2.

For example, in Manner 5, a value of the third identifier #1 is less than a value of the third identifier #2.

Manner 6: If a 1-bit field is empty, the first identifier is indicated; if a 1-bit field is not empty, and a value of the 1-bit field is 0, the third identifier #2 is indicated; or if a 1-bit field is not empty, and a value of the 1-bit field is 1, the third identifier #1 is indicated.

In Manner 6, the second identifier may be the third identifier #1 or the third identifier #2.

For example, in Manner 6, a value of the third identifier #1 is greater than a value of the third identifier #2.

N=2:

Manner 7: If a 2-bit field is not empty, and a value of the 2-bit field is 0, the first identifier is indicated; if a 2-bit field is not empty, and a value of the 2-bit field is 1, the third identifier #1 is indicated; if a 2-bit field is not empty, and a value of the 2-bit field is 2, the third identifier #2 is indicated; or if a 2-bit field is not empty, and a value of the 2-bit field is 3, the third identifier #3 is indicated.

In Manner 7, the second identifier may be the third identifier #1 or the third identifier #2.

For example, in Manner 7, a value of the third identifier #1 is less than a value of the third identifier #2, and a value of the third identifier #2 is less than a value of the third identifier #3.

Manner 8: If a 2-bit field is not empty, and a value of the 2-bit field is 0, the third identifier #1 is indicated; if a 2-bit field is not empty, and a value of the 2-bit field is 1, the third identifier #2 is indicated; if a 2-bit field is not empty, and a value of the 2-bit field is 2, the third identifier #3 is indicated; or if a 2-bit field is not empty, and a value of the 2-bit field is 3, the first identifier is indicated.

In Manner 8, the second identifier may be the third identifier #1 or the third identifier #2.

For example, in Manner 8, a value of the third identifier #1 is less than a value of the third identifier #2, and a value of the third identifier #2 is less than a value of the third identifier #3.

It should be understood that N=1 and N=2 are merely examples for describing possible implementations when the third indication information is a field in the DCI, and constitute no limitation on the protection scope of this disclosure. A specific form of the indication information may alternatively be another form. For example, N may alternatively be 3 or another positive integer.

In addition, the foregoing Manner 1 to Manner 8 are merely simple examples. Alternatively, there may be another permutation and combination manner. For example, if a 2-bit field is not empty, and a value of the 2-bit field is 2, the third identifier #1 is indicated; if a 2-bit field is not empty, and a value of the 2-bit field is 1, the third identifier #2 is indicated; if a 2-bit field is not empty, and a value of the 2-bit field is 3, the third identifier #3 is indicated; or if a 2-bit field is not empty, and a value of the 2-bit field is 0, the first identifier is indicated.

In Example 1, after the terminal device determines, based on the third indication information, whether the scrambling identifier of the data channel is the first identifier or the second identifier, that the terminal device further determines whether the DAI domain corresponds to transmission of a unicast data service or transmission of a multicast data service during specific application includes the following.

After receiving a control channel, the terminal device performs blind detection on the control channel, to obtain a DAI domain in DCI carried on the control channel.

It should be understood that, in this embodiment, how the DAI domain is used to count an HARQ-ACK codebook is not limited. For details, refer to related provisions in a current protocol or a future protocol.

In addition, it should be noted that the terminal device is configured as a terminal device that uses a Type-2 HARQ-ACK codebook.

The HARQ-ACK codebook in this embodiment includes a first HARQ-ACK codebook corresponding to the first identifier and at least one second HARQ-ACK codebook respectively corresponding to the at least one third identifier.

The terminal device needs to determine, based on the third indication information, that the DAI domain is used to count the first HARQ-ACK codebook corresponding to the first identifier or is used to count a third HARQ-ACK codebook corresponding to the second identifier in the at least one third identifier. The third HARQ-ACK codebook is a second HARQ-ACK codebook that is in the at least one second HARQ-ACK codebook and that corresponds to the second identifier. The first HARQ-ACK codebook corresponding to the first identifier may alternatively be understood as an HARQ-ACK codebook when the unicast data service is received, and the third HARQ-ACK codebook corresponding to the second identifier may alternatively be understood as an HARQ-ACK codebook when the first multicast data service is received.

Specifically, the terminal device can determine, based on the third indication information, whether the scrambling identifier of the data channel is the first identifier or the second identifier. If the scrambling identifier of the data channel is the first identifier, the terminal device determines that the DAI domain is used to count the first HARQ-ACK codebook corresponding to a unicast data service. Alternatively, if the scrambling identifier of the data channel is the second identifier, the terminal device determines that the DAI domain is used to count the third HARQ-ACK codebook corresponding to a multicast data service. In other words, the terminal device can determine whether an HARQ-ACK codebook belongs to a unicast or multicast data service, and HARQ feedback is not affected.

In addition, even if the terminal device supports transmission of a plurality of multicast data services, the terminal device may determine, based on indication information, a multicast data service to which currently to-be-received downlink data belongs and a scrambling identifier corresponding to the downlink data, to accurately distinguish a specific multicast data service to which the HARQ-ACK codebook belongs.

In Example 1, after the terminal device determines, based on the indication information, whether the scrambling identifier of the data channel is the first identifier or the second identifier, that the terminal device further determines whether the HPN domain corresponds to transmission of a unicast data service or transmission of a multicast data service during specific application includes the following.

After receiving a control channel, the terminal device performs blind detection on the control channel, to obtain an HPN domain in DCI included in the control channel. Management of an HARQ process in this embodiment includes management of a first HARQ process corresponding to the first identifier and management of at least one second HARQ process respectively corresponding to the at least one third identifier.

The terminal device needs to determine, based on the third indication information, that the HPN domain is used for management of the first HARQ process or management of a third HARQ process. Management of the third HARQ process is management of a second HARQ process that corresponds to the second identifier and that is in the at least one second HARQ process. Management of the first HARQ process corresponding to the first identifier may be understood as management of an HARQ process when the unicast data service is received, and management of the third HARQ process corresponding to the second identifier may be understood as management of an HARQ process when the first multicast data service is received.

That the terminal device determines that the HPN domain is used for management of the first HARQ process or management of the third HARQ process includes the following.

Manner (1): The terminal device determines, based on the third indication information, that the HPN domain is used for management of the first HARQ process or management of the third HARQ process.

Optionally, when the third indication information indicates that the scrambling identifier of the data channel is the first identifier, the terminal device determines that the HPN domain is used for management of the first HARQ process.

Optionally, when the third indication information indicates that the scrambling identifier of the data channel is the second identifier, the terminal device determines that the HPN domain is used for management of the third HARQ process.

Manner (2): The terminal device determines, based on the third indication information and an HPN value, that the HPN domain is used for management of the first HARQ process or management of the third HARQ process.

For example, if a maximum HPN value is less than 15, that is, HPN<N1, a value of N1 may be one of 1, 2, 3, 4, 5, 6, 7, 8, 9, 10, 11, 12, 13, 14 and 15. For another example, if a minimum HPN value is greater than 0, that is, HPN>N2, a value of N2 may be one of 0, 1, 2, 3, 4, 5, 6, 7, 8, 9, 10, 11, 12, 13, and 14.

Specifically, HPN values for multicast and unicast are different. For example, HPN values corresponding to a unicast data service have a total of 10 integers ranging from 0 to 9, and HPN values corresponding to a multicast data service have a total of 6 integers ranging from 10 to 15.

It should be understood that, in this embodiment, a specific value range of an HPN corresponding to a unicast data service and a specific value range of an HPN corresponding to a multicast data service are not limited. The foregoing HPN values ranging from 0 to 9 may correspond to a unicast data service, and the HPN values ranging from 10 to 15 may correspond to a multicast data service, or there may be another corresponding form.

It may be described as follows: When an HPN value belongs to a first set, the HPN value corresponds to a unicast data service, and an HPN domain is used for management of a first HARQ process; or when an HPN value belongs to a second set, the HPN value corresponds to a multicast data service, and an HPN domain is used for management of the at least one second HARQ process. The first set and the second set have no intersection.

In Manner (2), the terminal device first determines, based on the HPN value, whether the HPN domain is used for management of the first HARQ process or management of a second HARQ process in management of the at least one second HARQ process. When the HPN value belongs to the first set, the terminal device determines that the HPN domain is used for management of the first HARQ process; or when the HPN value belongs to the second set, the terminal device determines that the HPN domain is used for management of a second HARQ process in management of the at least one second HARQ process. Further, the terminal device determines, based on indication information, that the HPN domain is used for management of a third HARQ process.

It may be understood that in Manner (2), the third indication information only needs to indicate the second identifier for scrambling the data channel, and the indication information is an N-bit field, where N is a positive integer.

Alternatively, when the N-bit field is a second value, the indication information indicates that the scrambling identifier of the data channel is the second identifier.

The second value is a value that is in at least one third value and that indicates the second identifier. The at least one third value corresponds to the at least one third identifier.

For ease of understanding, the following uses an example in which N is 1 to describe how the indication information indicates the second identifier when the indication information is the N-bit field in Manner (2).

Manner 9: If a 1-bit field is empty, the third identifier #1 is indicated; or if a 1-bit field is not empty, the third identifier #2 is indicated.

In Manner 9, the second identifier may be the third identifier #1 or the third identifier #2.

For example, in Manner 9, a value of the third identifier #1 is less than a value of the third identifier #2.

Manner 10: If a 1-bit field is empty, the third identifier #2 is indicated; or if a 1-bit field is not empty, the third identifier #1 is indicated.

In Manner 10, the second identifier may be the third identifier #1 or the third identifier #2.

For example, in Manner 10, a value of the third identifier #2 is less than a value of the third identifier #1.

Manner 11: If a 1-bit field is not empty, and a value of the 1-bit field is 0, the third identifier #1 is indicated; or if a 1-bit field is not empty, and a value of the 1-bit field is 1, the third identifier #2 is indicated.

In Manner 11, the second identifier may be the third identifier #1 or the third identifier #2.

For example, in Manner 11, a value of the third identifier #1 is less than a value of the third identifier #2.

Manner 12: If a 1-bit field is not empty, and a value of the 1-bit field is 0, the third identifier #2 is indicated; or if a 1-bit field is not empty, and a value of the 1-bit field is 1, the third identifier #1 is indicated.

In Manner 12, the second identifier may be the third identifier #1 or the third identifier #2.

For example, in Manner 12, a value of the third identifier #2 is less than a value of the third identifier #1.

Manner 13: If a 1-bit field is empty, the third identifier #1 is indicated; if a 1-bit field is not empty, and a value of the 1-bit field is 0, the third identifier #2 is indicated; or if a 1-bit field is not empty, and a value of the 1-bit field is 1, the third identifier #3 is indicated.

In Manner 13, the second identifier may be the third identifier #1 or the third identifier #2.

For example, in Manner 13, a value of the third identifier #1 is less than a value of the third identifier #2, and a value of the third identifier #2 is less than a value of the third identifier #3.

Specifically, the terminal device can determine, based on the third indication information, whether the scrambling identifier of the data channel is the first identifier or the second identifier. If the scrambling identifier of the data channel is the first identifier, the terminal device determines that the HPN domain is used for management of the first HARQ process corresponding to a unicast data service. Alternatively, if the scrambling identifier of the data channel is the second identifier, the terminal device determines that the HPN domain is used for management of the third HARQ process corresponding to a multicast data service. In other words, the terminal device determines whether management of an HARQ process belongs to a unicast or multicast data service.

In addition, even if the terminal device supports transmission of a plurality of multicast data services, the terminal device may determine, based on the third indication information, a multicast data service to which the currently to-be-received downlink data belongs and a scrambling identifier corresponding to a data channel that carries the multicast data service, to accurately distinguish management of an HARQ process corresponding to a specific multicast data service that the HPN domain is used for.

In Example 1, after the terminal device determines, based on the third indication information, whether the scrambling identifier of the data channel is the first identifier or the second identifier, that the terminal device further determines whether the FDRA domain corresponds to transmission of a unicast data service or transmission of a multicast data service during specific application includes the following.

After receiving a control channel, the terminal device performs blind detection on the control channel, to obtain an FDRA domain in DCI included in the control channel.

The FDRA domain in this embodiment may be used to determine a first frequency domain resource occupied by a data channel scrambled by using the first identifier, and may be further used to determine at least one second frequency domain resource occupied by at least one data channel respectively scrambled by using the at least one third identifier.

The terminal device needs to determine, based on the third indication information, whether the FDRA domain is used to determine the first frequency domain resource or a third frequency domain resource, where the third frequency domain resource is a second frequency domain resource that is in the at least one second frequency domain resource and that corresponds to the second identifier. The first frequency domain resource may be understood as a frequency domain resource occupied by a data channel when the unicast data service is received, and the third frequency domain resource may be understood as a frequency domain resource occupied by a data channel when the first multicast data service is received.

That the terminal device determines whether the FDRA domain is used to determine the first frequency domain resource or the third frequency domain resource includes the following.

The terminal device determines, based on the received third indication information, whether the FDRA domain uses a unicast or multicast available frequency domain resource, to calculate an RBG, or an RB start location and an RB quantity that are corresponding to a PDSCH scheduled by using the DCI. For a downlink resource assignment type 0, the terminal device obtains, through calculation, an available RBG. For a downlink resource assignment type 1, the terminal device obtains, through calculation, a start RB and a quantity of occupied RBs of the PDSCH.

Example 2: The Third Indication Information
Indicates a Scrambling Identifier of the Data
Channel Based on a Preset Condition When a multicast scheduling dedicated bandwidth BWP resource corresponding to the second identifier is assigned to the terminal device, the third indication information indicates that the scrambling identifier of the data channel is the second identifier. For example, if the terminal device is preconfigured in the multicast scheduling dedicated BWP corresponding to the second identifier, the data channel is scrambled by using the second identifier; or if the terminal device is not preconfigured in the multicast scheduling dedicated BWP corresponding to the second identifier, the data channel is scrambled by using the first identifier.

Alternatively, it is as follows.

When the terminal device detects the control channel in multicast dedicated search space corresponding to the second identifier, the third indication information indicates that the scrambling identifier of the data channel is the second identifier. For example, if the terminal device successfully blindly detects the control channel in the multicast dedicated search space corresponding to the second identifier, the data channel is scrambled by using the second identifier; or if the terminal device fails to blindly detect the control channel in the multicast dedicated search space corresponding to the second identifier, the data channel is scrambled by using the first identifier.

Possibility 2: Direct Indication.

For example, in Possibility 2, the third indication information may directly indicate whether the DAI domain, the HPN domain, and the FDRA domain included in the DCI correspond to transmission of a unicast data service or transmission of a multicast data service during specific application. This is different from the case in which the third indication information indirectly indicates the functions of the DAI domain, the HPN domain, and the FDRA domain by indicating the scrambling identifier of the data channel and that is shown in Possibility 1.

For example, the third indication information directly indicates that the DAI domain is used to count an HARQ-ACK codebook when the unicast data service is received; or the third indication information directly indicates that the DAI domain is used to count an HARQ-ACK codebook when the first multicast data service is received.

For another example, the third indication information directly indicates that the HPN domain is used for management of an HARQ process when the unicast data service is received; or the third indication information directly indicates that the HPN domain is used for management of an HARQ process when the first multicast data service is received.

For another example, the third indication information directly indicates that the FDRA domain is used to determine a frequency domain resource occupied by a data channel when the unicast data service is received; or the third indication information directly indicates that the FDRA domain is used to determine a frequency domain resource occupied by a data channel when the first multicast data service is received.

A specific form of the third indication information in Possibility 2 is similar to that in Possibility 1.

The following uses an example to describe a possible form of the indication information.

Example 1: The Third Indication Information Explicitly Indicates a Function of the Information Included in the DCI Optionally, the third indication information is an M-bit field, and Mis a positive integer.

When the M-bit field is a first value, the third indication information indicates at least one of the following: The DAI domain is used to count an HARQ-ACK codebook when the unicast data service is received, the HPN domain is used for management of an HARQ process when the unicast data service is received, or the FDRA domain is used to determine a frequency domain resource occupied by a data channel when the unicast data service is received.

When the M-bit field is a second value, the third indication information indicates at least one of the following: the DAI domain is used to count an HARQ-ACK codebook when the first multicast data service is received, the HPN domain is used for management of an HARQ process when the first multicast data service is received, or the FDRA domain is used to determine a frequency domain resource occupied by a data channel when the first multicast data service is received.

The second value is a value that is in at least one third value and that indicates the first multicast data service. The at least one third value corresponds to the at least one multicast data service.

Specifically, the M-bit field is similar to the N-bit field in the foregoing Possibility 1. A difference lies in that the N-bit field indicates the scrambling identifier of the data channel, and the M-bit field directly indicates whether the information included in the DCI specifically corresponds to the unicast data service or the first multicast data service.

For example, the following corresponds to the foregoing Manner 1. If a 1-bit field is empty, at least one of the following is indicated: The DAI domain is used to count an HARQ-ACK codebook when the unicast data service is received, the HPN domain is used for management of an HARQ process when the unicast data service is received, or the FDRA domain is used to determine a frequency domain resource occupied by a data channel when the unicast data service is received. Alternatively, if a 1-bit field is not empty, at least one of the following is indicated: The DAI domain is used to count an HARQ-ACK codebook when the first multicast data service is received, the HPN domain is used for management of an HARQ process when the first multicast data service is received, or the FDRA domain is used to determine a frequency domain resource occupied by a data channel when the first multicast data service is received. For Manner 2 to Manner 13, refer to the foregoing descriptions.

Example 2: The Indication Information Indicates, Based on a Preset Condition, a Function of the Information Included in the DCI When a multicast scheduling dedicated bandwidth BWP resource corresponding to the first multicast data service is assigned to the terminal device, the indication information indicates at least one of the following: The DAI domain is used to count an HARQ-ACK codebook when the unicast data service is received, the HPN domain is used for management of an HARQ process when the unicast data service is received, or the FDRA domain is used to determine a frequency domain resource occupied by a data channel when the unicast data service is received.

Alternatively, it is as follows.

When the terminal device detects the control channel in multicast dedicated search space corresponding to the first multicast data service, the indication information indicates at least one of the following: The DAI domain is used to count an HARQ-ACK codebook when the first multicast data service is received, the HPN domain is used for management of an HARQ process when the first multicast data service is received, or the FDRA domain is used to determine a frequency domain resource occupied by a data channel when the first multicast data service is received.

For example, the third indication information includes third indication information #1, third indication information #2, and third indication information #3. The third indication information #1 indicates that the DAI domain is used to count an HARQ-ACK codebook when the unicast data service or the first multicast data service is received. The third indication information #2 indicates that the HPN domain is used for management of an HARQ process when the unicast data service or the first multicast data service is received. The third indication information #3 indicates that the FDRA domain is used to determine a frequency domain resource occupied by a data channel when the unicast data service or the first multicast data service is received.

Design manners of the third indication information #1, the third indication information #2, and the third indication information #3 are similar to that of the third indication information.

Specifically, after sending the control channel to the terminal device, the network device sends, to the terminal device, a data channel that carries downlink data. The method shown in FIG. 4 further includes the following step.

S411: The network device sends a data channel to the terminal device.

For example, the downlink data is carried on a PDSCH. In other words, that the network device sends a data channel to the terminal device may be understood as the following: The network device sends the PDSCH to the terminal device.

Optionally, the downlink data is a unicast data service, and the data channel is scrambled by using the first identifier.

Optionally, the downlink data is a first multicast data service, and the data channel is scrambled by using the second identifier. The first multicast data service is any one of at least one multicast data service that can be received by the terminal device.

Further, after the terminal device and the network device align understandings for the DAI domain, the HPN domain, or the FDRA domain in the DCI, data can be transmitted between the network device and the terminal device.

For example, after the terminal device and the network device align understandings for the DAI domain in the DCI, the terminal device may feed back, to the network device, an HARQ-ACK codebook that corresponds to unicast scheduling or multicast scheduling and that is determined based on the DAI domain.

For another example, after the terminal device and the network device align understandings for the HPN domain in the DCI, when the network device retransmits a unicast data service or a multicast data service to the terminal device, the terminal device may determine, based on the HPN domain, ownership for management of an HARQ process.

For another example, after the terminal device and the network device align understandings for the FDRA domain in the DCI, the terminal device may determine a frequency domain resource based on the FDRA domain, and correctly receive a unicast data service or a multicast data service.

It should be noted that, in this embodiment, that the indication information indicates whether the DAI domain, the HPN domain, or the FDRA domain in the DCI corresponds to a unicast data service or a multicast data service is merely an example and does not constitute any limitation on the protection scope of this disclosure. For example, when another information domain in the DCI is applied differently in a unicast scheduling manner and a multicast scheduling manner, alignment between the terminal device and the network device may also be implemented with reference to the method provided in this embodiment.

In the method embodiments, the sequence numbers of the foregoing processes do not mean execution sequences. The execution sequences of the processes should be determined based on functions and internal logic of the processes, and should not be construed as any limitation on the implementation processes of embodiments of this disclosure. In addition, not all operations in the method embodiments need to be performed.

It should be understood that the terminal device and/or the network device in the foregoing method embodiments may perform some or all of the steps in the embodiments. These steps or operations are merely examples. In embodiments of this disclosure, other operations or variants of the various operations may be further included.

It may be understood that, in the foregoing method embodiments, the method implemented by the terminal device may also be implemented by a component (for example, a chip or a circuit) used in the terminal device. The method implemented by the network device may also be implemented by a component used in the network device.

It should further be understood that, in embodiments of this disclosure, unless otherwise stated or there is a logic conflict, terms and/or descriptions between different embodiments may be consistent and may be mutually referenced, and technical features in different embodiments may be combined based on an internal logical relationship thereof, to form a new embodiment.

The foregoing describes in detail the data transmission method in embodiments of this disclosure with reference to FIG. 2 to FIG. 4. The following describes in detail apparatuses provided in embodiments of this disclosure with reference to FIG. 6 to FIG. 9.

Figure 6:
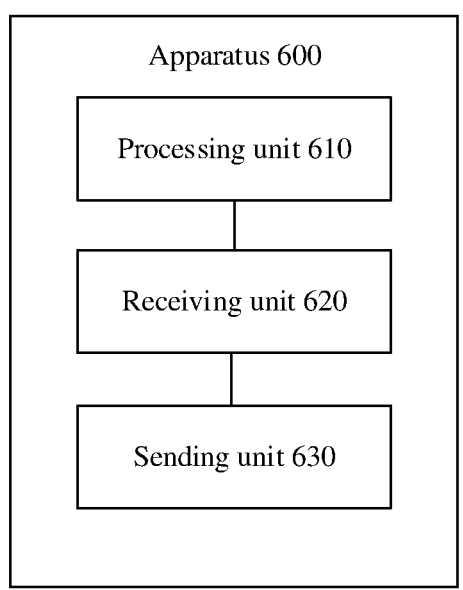
FIG. 6 is a schematic diagram of a data receiving apparatus 600 according to an embodiment of this disclosure.

FIG. 6 is a schematic diagram of a data receiving apparatus 600 according to an embodiment of this disclosure. As shown in FIG. 6, the apparatus 600 includes a processing unit 610, a receiving unit 620, and a sending unit 630.

The receiving unit 620 is configured to receive first DCI, where cyclic redundancy check CRC of the first DCI is scrambled by using a first radio network temporary identifier (RNTI), the first DCI is used to schedule a first downlink data channel, the first downlink data channel is scrambled by using a second RNTI, the first downlink data channel is scheduled in a public frequency resource, the public frequency resource is configured in a bandwidth part (BWP), the BWP is a dedicated BWP configured for the terminal device, the first DCI includes a downlink assignment index (DAI) domain and/or a frequency domain resource assignment (FDRA) domain, the DAI domain indicates a count of first hybrid automatic repeat request-acknowledgment (HARQ-ACK) information in a first HARQ-ACK codebook, the first HARQ-ACK information corresponds to the first downlink data channel, the first HARQ-ACK codebook corresponds to the first RNTI, and the FDRA domain indicates, within a frequency domain range of the public frequency resource, a scheduled frequency domain resource on the first downlink data channel.

The receiving unit 620 is further configured to receive the first downlink data channel based on the first DCI.

Alternatively, it is as follows.

When the apparatus 600 is configured to monitor second DCI and third DCI, the receiving unit 620 is configured to the second DCI, where the second DCI is used to schedule a second downlink data channel, the third DCI is used to schedule a third downlink data channel, cyclic redundancy check (CRC) of the second DCI is scrambled by using a third radio network temporary identifier (RNTI), CRC of the third DCI is scrambled by using a fourth RNTI, the second DCI includes a first hybrid automatic repeat request process number (HPN) domain and a first new data indicator (NDI) domain, and the third DCI includes a second HPN domain and a second NDI domain. The terminal device receives fourth DCI, where the fourth DCI is used to schedule a fourth downlink data channel, CRC of the fourth DCI is scrambled by using a fifth RNTI, and the fourth DCI includes a third HPN domain and a third NDI domain.

The processing unit 610 is configured to determine that the fifth RNTI is associated with the third RNTI.

The receiving unit 620 is further configured to receive the fourth downlink data channel.

The apparatus 600 corresponds to the terminal device in the method embodiment. The apparatus 600 may be the terminal device in the method embodiment, or a chip or a functional module in the terminal device in the method embodiment. A corresponding unit in the apparatus 600 is configured to perform a corresponding step performed by the terminal device in the method embodiments shown in FIG. 2 to FIG. 4.

The processing unit 610 in the apparatus 600 is configured to perform the processing-related step corresponding to the terminal device in the method embodiments. The receiving unit 620 in the apparatus 600 performs the receiving step of the terminal device in the method embodiments. The sending unit 630 in the apparatus 600 is configured to perform the sending step of the terminal device.

The receiving unit 620 and the sending unit may form a transceiver unit that has both receiving and sending functions. The processing unit 610 may be at least one processor. The sending unit may be a transmitter or an interface circuit, and the receiving unit 620 may be a receiver or an interface circuit. The receiver and the transmitter may be integrated together to form a transceiver or an interface circuit.

Optionally, the apparatus 600 may further include a storage unit. The storage unit is configured to store data and/or signaling. The processing unit 610, the sending unit, and the receiving unit 620 may interact with or be coupled to the storage unit. For example, the data and/or signaling in the storage unit are read or invoked, so that the method in the foregoing embodiment is performed.

The foregoing units may exist independently, or may be all or partially integrated.

Figure 7:
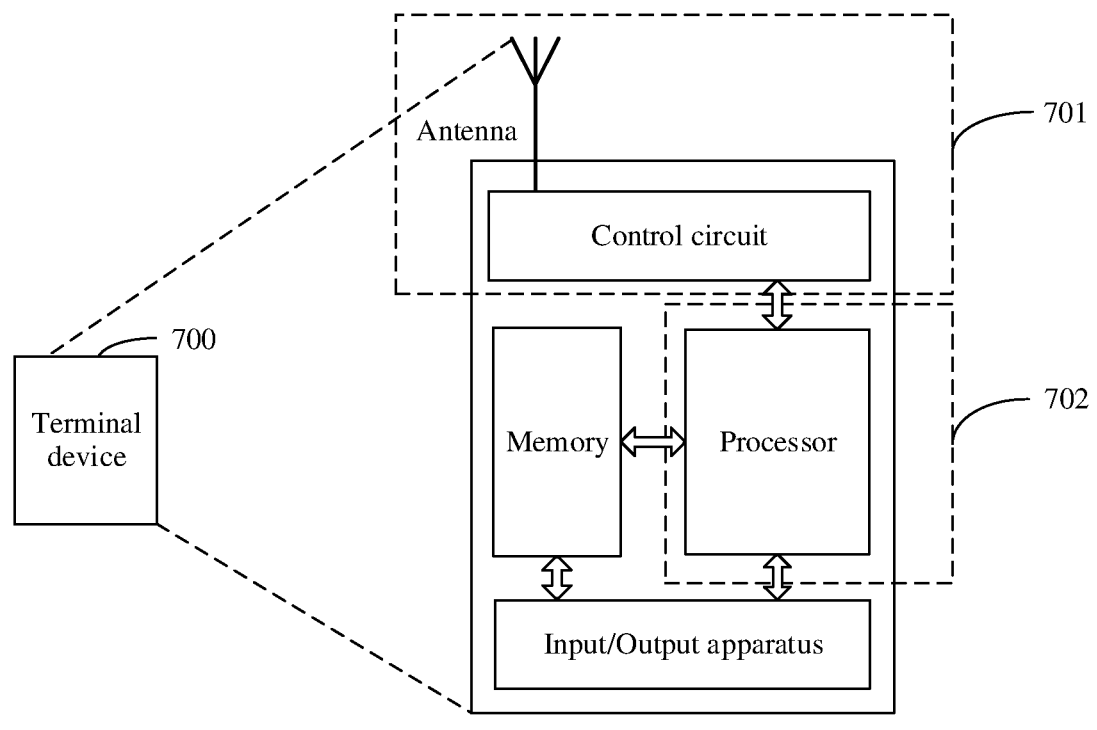
FIG. 7 is a schematic diagram of a structure of a terminal device 700 applicable to an embodiment of this disclosure.

FIG. 7 is a schematic diagram of a structure of a terminal device 700 applicable to an embodiment of this disclosure. The terminal device 700 may be applied to the system shown in FIG. 1. For ease of description, FIG. 7 shows only main components of the terminal device. As shown in FIG. 7, the terminal device 700 includes a processor, a memory, a control circuit, an antenna, and an input/output apparatus. The processor is configured to control the antenna and the input/output apparatus to send or receive a signal. The memory is configured to store a computer program. The processor is configured to invoke the computer program from the memory and run the computer program, to perform a corresponding process and/or operation performed by the terminal device in the method for registration provided in this disclosure.

A person skilled in the art may understand that, for ease of description, FIG. 7 shows only one memory and one processor. In an actual terminal device, there may be a plurality of processors and memories. The memory may alternatively be referred to as a storage medium, a storage device, or the like. This is not limited in embodiments of this disclosure.

Figure 8:
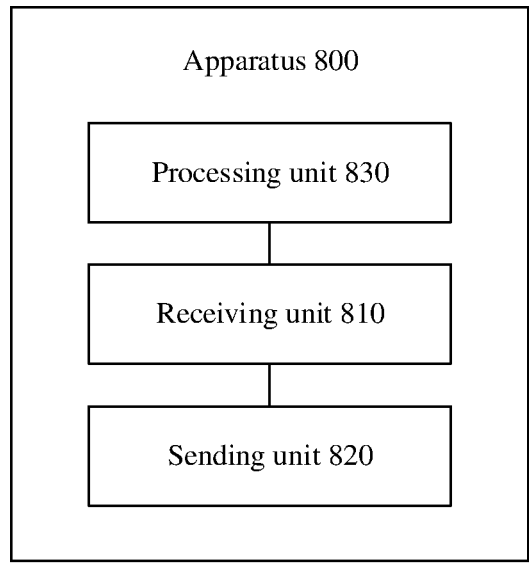
FIG. 8 is a schematic diagram of a data sending apparatus 800 according to this disclosure.

FIG. 8 is a schematic diagram of a data sending apparatus 800 according to an embodiment of this disclosure. As shown in FIG. 8, the apparatus 800 includes a receiving unit 810, a sending unit 820, and a processing unit 830.

The sending unit 820 is configured to send first DCI, where cyclic redundancy check CRC of the DCI is scrambled by using a first radio network temporary identifier (RNTI), the first DCI is used to schedule a first downlink data channel, the first downlink data channel is scrambled by using a second RNTI, the first downlink data channel is scheduled in a public frequency resource, the public frequency resource is configured in a bandwidth part (BWP), the BWP is a dedicated BWP configured for the terminal device, the first DCI includes a downlink assignment index (DAI) domain and/or a frequency domain resource assignment (FDRA) domain, the DAI domain indicates a count of first hybrid automatic repeat request-acknowledgment (HARQ-ACK) information in a first HARQ-ACK codebook, the first HARQ-ACK information corresponds to the first downlink data channel, the first HARQ-ACK codebook corresponds to the first RNTI, and the FDRA domain indicates, within a frequency domain range of the public frequency resource, a scheduled frequency domain resource on the first downlink data channel.

The sending unit 820 is further configured to send the first downlink data channel based on the first DCI.

Alternatively, it is as follows.

The sending unit 820 is configured to send second downlink control information (DCI) to a terminal device, where the terminal device is configured to monitor the second DCI and third DCI, the second DCI is used to schedule a second downlink data channel, the third DCI is used to schedule a third downlink data channel, cyclic redundancy check (CRC) of the second DCI is scrambled by using a third radio network temporary identifier (RNTI), CRC of the third DCI is scrambled by using a fourth RNTI, the second DCI includes a first hybrid automatic repeat request process number (HPN) domain and a first new data indicator (NDI) domain, and the third DCI includes a second HPN domain and a second NDI domain.

The sending unit 820 is further configured to send fourth DCI to the terminal device, where the fourth DCI is used to schedule a fourth downlink data channel, CRC of the fourth DCI is scrambled by using a fifth RNTI, the fourth DCI includes a third HPN domain and a third NDI domain, and the fifth RNTI is associated with the third RNTI.

The apparatus 800 corresponds to the network device in the method embodiments. The apparatus 800 may be the network device in the method embodiments, or a chip or a functional module in the network device in the method embodiments. A corresponding unit in the apparatus 800 is configured to perform a corresponding step performed by the network device in the method embodiments shown in FIG. 2 to FIG. 4.

The sending unit 820 in the apparatus 800 performs the sending step of the network device in the method embodiment. The receiving unit 810 in the apparatus 800 is configured to perform the receiving step of the network device. The apparatus 800 may further include a processing unit 830, configured to perform a corresponding processing-related step inside the network device.

The receiving unit 810 and the sending unit 820 may form a transceiver unit that has both receiving and sending functions. The processing unit 830 may be at least one processor. The sending unit 820 may be a transmitter or an interface circuit. The receiving unit 810 may be a receiver or an interface circuit. The receiver and the transmitter may be integrated together to form a transceiver or an interface circuit.

Optionally, the apparatus 800 may further include a storage unit, configured to store data and/or signaling. The processing unit 830, the sending unit 820, and the receiving unit 810 may interact with or be coupled to the storage unit. For example, the data and/or signaling in the storage unit are read or invoked, so that the method in the foregoing embodiment is performed.

The foregoing units may exist independently, or may be all or partially integrated.

Figure 9:
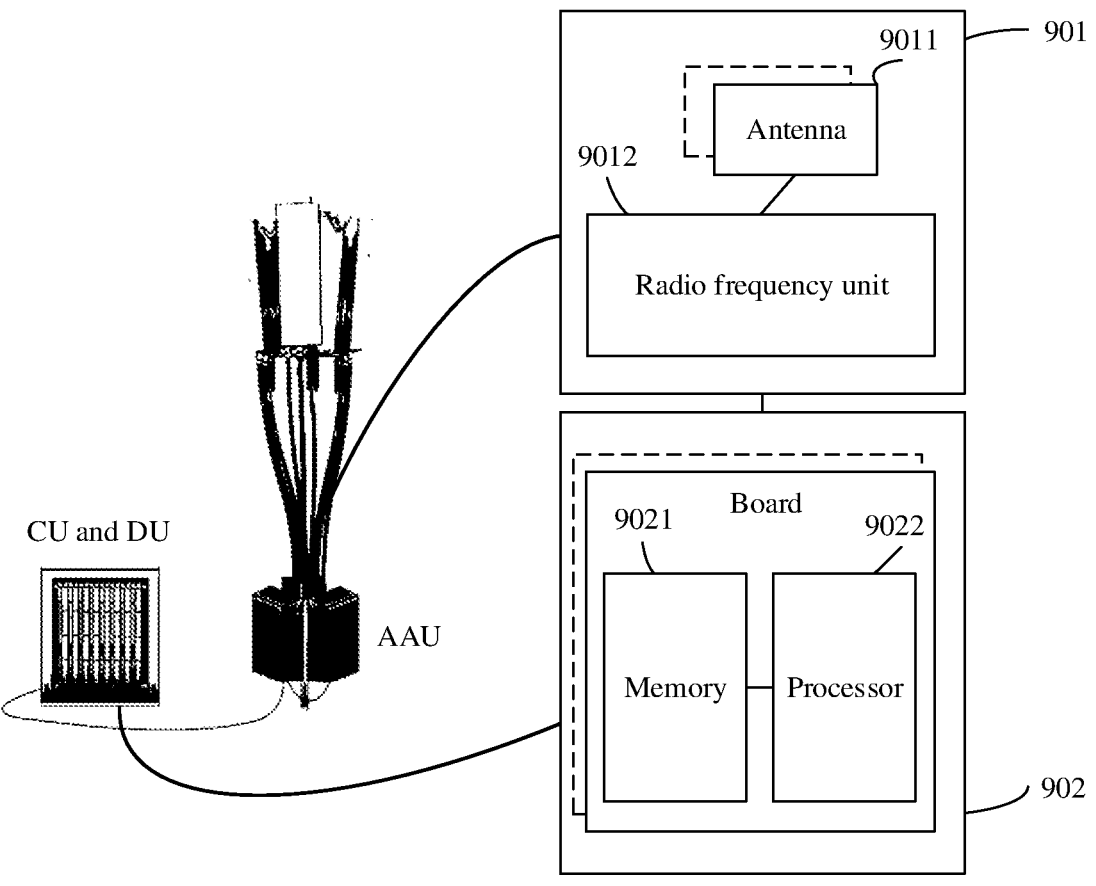
FIG. 9 is a schematic diagram of a structure of a network device 900 applicable to an embodiment of this disclosure.

FIG. 9 is a schematic diagram of a structure of a network device 900 applicable to an embodiment of this disclosure. The network device 900 may be configured to implement functions of the network device in the data transmission method. FIG. 9 may be a schematic diagram of a structure of the network device.

In a possible manner, for example, in some implementation solutions in a 5G communication system, the network device 900 may include a CU, a DU, and an AAU. Compared with a network device that is in an LTE communication system and that includes one or more baseband units (BBU) and one or more radio frequency units such as remote radio units (RRU), a non-real-time part of an original BBU is split and redefined as a CU, which is responsible for processing a non-real-time protocol and service, some physical layer processing functions of the BBU are combined into an AAU with an original RRU and a passive antenna, and remaining functions of the BBU are redefined as a DU, which is responsible for processing a physical layer protocol and a real-time service. In short, the CU and the DU are distinguished based on real-time performance of processed content, and the AAU is a combination of the RRU and the antenna.

The CU, the DU, and the AAU may be deployed separately or together. Therefore, there may be a plurality of network deployment forms. A possible deployment form is consistent with that of a conventional 4G network device, in which the CU and the DU are deployed on same hardware. It should be understood that FIG. 9 is merely an example, and constitutes no limitation on the protection scope of this disclosure. For example, the deployment form may alternatively be that the DU is deployed in a 6G BBU equipment room, CUs or DUs are deployed together, or CUs are centralized at a higher level.

The AAU 901 may implement a transceiver function, is referred to as a transceiver unit 901, and corresponds to the sending unit 820 in FIG. 8. Optionally, the transceiver unit 901 may alternatively be referred to as a transceiver machine, a transceiver circuit, a transceiver, or the like, and may include at least one antenna 9011 and a radio frequency unit 9012. Optionally, the transceiver unit 901 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The "CU and DU" 902 may implement an internal processing function, and are referred to as a processing unit 902. Optionally, the processing unit 902 may control the network device or the like, and may be referred to as a controller. The AAU 901 and the "CU and DU" 902 may be physically disposed together, or may be physically disposed separately.

In addition, the network device is not limited to the form shown in FIG. 9, and may alternatively be in another form. For example, the network device includes the BBU and an ARU, or includes the BBU and the AAU, or may be a CPE, or may be in another form. This is not limited in this disclosure.

It should be understood that the network device 900 shown in FIG. 9 can implement functions of the network device in the method embodiments in FIG. 2 to FIG. 4. Operations and/or functions of the units in the network device 900 are used to implement a corresponding process performed by the network device in the foregoing method embodiments of this disclosure. To avoid repetition, detailed descriptions are appropriately omitted herein. The structure of the network device shown in FIG. 9 is merely a possible form, and should not constitute any limitation to this embodiment. This disclosure does not exclude a possibility that there may be a network device structure in another form in the future.

An embodiment of this disclosure further provides a communication system, including the foregoing terminal device and the foregoing network device.

This disclosure further provides a computer-readable storage medium. The computer-readable storage medium stores instructions. When the instructions are run on a computer, the computer is enabled to perform the steps performed by the terminal device in the methods shown in FIG. 2 to FIG. 4.

This disclosure further provides a computer-readable storage medium. The computer-readable storage medium stores instructions. When the instructions are run on a computer, the computer is enabled to perform the steps performed by the network device in the methods shown in FIG. 2 to FIG. 4.

This disclosure further provides a computer program product including instructions. When the computer program product runs on a computer, the computer is enabled to perform the steps performed by the terminal device in the methods shown in FIG. 2 to FIG. 4.

This disclosure further provides a computer program product including instructions. When the computer program product runs on a computer, the computer is enabled to perform the steps performed by the network device in the methods shown in FIG. 2 to FIG. 4.

This disclosure further provides a chip including a processor. The processor is configured to read and run a computer program stored in a memory, to perform a corresponding operation and/or process performed by the terminal device in the data transmission method provided in this disclosure. Optionally, the chip further includes the memory. The memory is connected to the processor through a circuit or a wire. The processor is configured to read and execute the computer program in the memory. Further optionally, the chip further includes a communication interface, and the processor is connected to the communication interface. The communication interface is configured to receive processed data and/or information. The processor obtains the data and/or the information from the communication interface, and processes the data and/or the information. The communication interface may be an input/output interface, an interface circuit, an output circuit, an input circuit, a pin, a related circuit, or the like in the chip. The processor may alternatively be embodied as a processing circuit or a logic circuit.

This disclosure further provides a chip including a processor. The processor is configured to read and run a computer program stored in a memory, to perform a corresponding operation and/or process performed by the network device in the data transmission method provided in this disclosure. Optionally, the chip further includes the memory. The memory is connected to the processor through a circuit or a wire. The processor is configured to read and execute the computer program in the memory. Further optionally, the chip further includes a communication interface, and the processor is connected to the communication interface. The communication interface is configured to receive processed data and/or information. The processor obtains the data and/or the information from the communication interface, and processes the data and/or the information. The communication interface may be an input/output interface, an interface circuit, an output circuit, an input circuit, a pin, a related circuit, or the like in the chip. The processor may alternatively be embodied as a processing circuit or a logic circuit.

The foregoing chip may alternatively be replaced with a chip system.

In this disclosure, the terms "include", "contain", and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

A person of ordinary skill in the art may be aware that units and algorithm steps in the examples described with reference to embodiments disclosed in this specification may be implemented by electronic hardware or a combination of computer software and electronic hardware. Whether the functions are executed by hardware or software depends on a particular disclosure and a design constraint condition that are of the technical solutions. A person skilled in the art may use different methods to implement the described functions for each particular disclosure, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments.

In several embodiments provided in this disclosure, it should be understood that the disclosed system, apparatus and method may be implemented in another manner. The described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, that is, may be located in one location, or may be distributed on a plurality of network units. Some or all of the units may be selected based on actual requirements to achieve the objectives of the solutions of embodiments.

In addition, functional units in embodiments of this disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this disclosure essentially, or the part contributing to a current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this disclosure. The foregoing storage medium includes any medium that can store program code, such as a USB flash drive, a removable hard disk, a read-only memory (ROM), a random access memory (RAM), a magnetic disk, or an optical disc.

In addition, the term "and/or" in this disclosure describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. The term "at least one" in this disclosure may represent "one" and "two or more". For example, at least one of A, B, and C may indicate the following seven cases: Only A exists, only B exists, only C exists, both A and B exist, both A and C exist, both C and B exist, and A, B, and C exist.

The foregoing descriptions are merely specific implementations of this disclosure, but the protection scope of this disclosure is not limited thereto. Any variation or replacement readily figured out by a person skilled in the art within the technical scope disclosed in this disclosure shall fall within the protection scope of this disclosure. Therefore, the protection scope of this disclosure shall be subject to the protection scope of the claims.

The invention claimed is:

1. A data receiving method, comprising:

receiving, by a terminal device, second downlink control information (DCI), wherein the terminal device is configured to monitor the second DCI and third DCI;

a second downlink data channel is scheduled using the second DCI, a third downlink data channel is scheduled using the third DCI, cyclic redundancy check (CRC) of the second DCI is scrambled by using a third radio network temporary identifier (RNTI), CRC of the third DCI is scrambled by using a fourth RNTI; the second DCI comprises a first hybrid automatic repeat request process number (HPN) domain and a first new data indicator (NDI) domain, and the third DCI comprises a second HPN domain and a second NDI domain;

receiving, by the terminal device, fourth DCI, wherein a fourth downlink data channel is scheduled using the fourth DCI, CRC of the fourth DCI is scrambled by using a fifth RNTI, and the fourth DCI comprises a third HPN domain and a third NDI domain;

determining, by the terminal device based on a time window corresponding to the third RNTI, that the fifth RNTI is associated with the third RNTI; and receiving, by the terminal device, the fourth downlink data channel.

2. The method according to claim 1, wherein the third RNTI is a second group radio network temporary identifier (G-RNTI), the fourth RNTI is a third G-RNTI, and the fifth RNTI is a second cell radio network temporary identifier (C-RNTI).

3. The method according to claim 1, wherein, when a value of the first HPN domain is equal to a value of the third HPN domain, the method further comprises:

determining, by the terminal device based on a value of the third NDI domain, that the fourth downlink data channel carries a newly transmitted data packet or carries a retransmitted data packet; or determining, by the terminal device based on a value of the third NDI domain and a value of the first NDI domain, that the fourth downlink data channel carries a newly transmitted data packet or carries a retransmitted data packet, wherein the newly transmitted data packet is different from a data packet carried on the second downlink data channel, and the retransmitted data packet is the same as the data packet carried on the second downlink data channel.

4. The method according to claim 1, wherein a value of the first HPN domain is equal to a value of the second HPN domain.

5. A data sending method, comprising:

sending, by a network device, second downlink control information (DCI) to a terminal device, wherein the terminal device is configured to monitor the second DCI and third DCI, wherein a second downlink data channel is scheduled using the second DCI, a third downlink data channel is scheduled using the third DCI, cyclic redundancy check (CRC) of the second DCI is scrambled by using a third radio network temporary identifier (RNTI), CRC of the third DCI is scrambled by using a fourth RNTI; the second DCI comprises a first hybrid automatic repeat request process number (HPN) domain and a first new data indicator (NDI) domain, and the third DCI comprises a second HPN domain and a second NDI domain;

sending, by the network device, fourth DCI to the terminal device, wherein a fourth downlink data channel is scheduled using the fourth DCI, CRC of the fourth DCI is scrambled by using a fifth RNTI, the fourth DCI comprises a third HPN domain and a third NDI domain, and it is determined that the fifth RNTI is associated with the third RNTI based on a time window corresponding to the third RNTI; and sending, by the network device, the fourth downlink data channel to the terminal device.

6. The method according to claim 5, wherein the fourth DCI carries first indication information indicating that the fifth RNTI is associated with the third RNTI; or the method further comprises:

sending, by the network device, signaling at a layer higher than a physical layer, wherein the signaling carries second indication information indicating that the fifth RNTI is associated with the third RNTI.

7. The method according to claim 5, wherein the third RNTI is a second group radio network temporary identifier (G-RNTI), the fourth RNTI is a third G-RNTI, and the fifth RNTI is a second cell radio network temporary identifier (C-RNTI).

8. The method according to claim 5, wherein, when a value of the first HPN domain is equal to a value of the third HPN domain, a value of the third NDI domain is used to determine that a fifth downlink data channel carries a newly transmitted data packet or carries a retransmitted data packet; or a value of the third NDI domain and a value of the first NDI domain are used to determine that the fifth downlink data channel carries a newly transmitted data packet or carries a retransmitted data packet, wherein the newly transmitted data packet is different from a data packet carried on the third downlink data channel, and the retransmitted data packet is the same as the data packet carried on the third downlink data channel.

9. The method according to claim 5, wherein a value of the first HPN domain is equal to a value of the second HPN domain.

10. An apparatus, comprising: one or more processors configured to receive second downlink control information (DCI), wherein the apparatus is configured to monitor the second DCI and third DCI; a second downlink data channel is scheduled using the second DCI, a third downlink data channel is scheduled using the third DCI, cyclic redundancy check (CRC) of the second DCI is scrambled by using a third radio network temporary identifier (RNTI), CRC of the third DCI is scrambled by using a fourth RNTI; the second DCI comprises a first hybrid automatic repeat request process number (HPN) domain and a first new data indicator (NDI) domain, and the third DCI comprises a second HPN domain and a second NDI domain;

receive fourth DCI, wherein a fourth downlink data channel is scheduled using the fourth DCI, CRC of the fourth DCI is scrambled by using a fifth RNTI, and the fourth DCI comprises a third HPN domain and a third NDI domain;

determine based on a time window corresponding to the third RNTI that the fifth RNTI is associated with the third RNTI; and receive the fourth downlink data channel.

11. The apparatus according to claim 10, wherein the third RNTI is a second group radio network temporary identifier (G-RNTI), the fourth RNTI is a third G-RNTI, and the fifth RNTI is a second cell radio network temporary identifier (C-RNTI).

12. The apparatus according to claim 10, wherein, when a value of the first HPN domain is equal to a value of the third HPN domain, the one or more processors are further configured to:

determine based on a value of the third NDI domain, that the fourth downlink data channel carries a newly transmitted data packet or carries a retransmitted data packet; or determine based on a value of the third NDI domain and a value of the first NDI domain, that the fourth downlink data channel carries a newly transmitted data packet or carries a retransmitted data packet, wherein the newly transmitted data packet is different from a data packet carried on the second downlink data channel, and the retransmitted data packet is the same as the data packet carried on the second downlink data channel.

13. The apparatus according to claim 10, wherein a value of the first HPN domain is equal to a value of the second HPN domain.

14. An apparatus, comprising: one or more processors configured to send second downlink control information (DCI) to a terminal device, wherein the terminal device is configured to monitor the second DCI and third DCI, wherein a second downlink data channel is scheduled using the second DCI, a third downlink data channel is scheduled using the third DCI, cyclic redundancy check (CRC) of the second DCI is scrambled by using a third radio network temporary identifier (RNTI), CRC of the third DCI is scrambled by using a fourth RNTI; the second DCI comprises a first hybrid automatic repeat request process number (HPN) domain and a first new data indicator (NDI) domain, and the third DCI comprises a second HPN domain and a second NDI domain;

send fourth DCI to the terminal device, wherein a fourth downlink data channel is scheduled using the fourth DCI, CRC of the fourth DCI is scrambled by using a fifth RNTI, the fourth DCI comprises a third HPN domain and a third NDI domain, and it is determined that the fifth RNTI is associated with the third RNTI based on a time window corresponding to the third RNTI; and send the fourth downlink data channel to the terminal device.

15. The apparatus according to claim 14, wherein the fourth DCI carries first indication information, and the first indication information indicates that the fifth RNTI is associated with the third RNTI; or the one or more processors are further configured to:

send signaling at a layer higher than a physical layer, wherein the signaling carries second indication information, and the second indication information indicates that the fifth RNTI is associated with the third RNTI.

16. The apparatus according to claim 14, wherein the third RNTI is a second group radio network temporary identifier (G-RNTI), the fourth RNTI is a third G-RNTI, and the fifth RNTI is a second cell radio network temporary identifier (C-RNTI).

17. The apparatus according to claim 14, wherein, when a value of the first HPN domain is equal to a value of the third HPN domain, a value of the third NDI domain is used to determine that a fifth downlink data channel carries a newly transmitted data packet or carries a retransmitted data packet; or a value of the third NDI domain and a value of the first NDI domain are used to determine that the fifth downlink data channel carries a newly transmitted data packet or carries a retransmitted data packet, wherein the newly transmitted data packet is different from a data packet carried on the third downlink data channel, and the retransmitted data packet is the same as the data packet carried on the third downlink data channel.

18. The apparatus according to claim 14, wherein a value of the first HPN domain is equal to a value of the second HPN domain.

* * * * *